(12) United States Patent
Zorgui et al.

(10) Patent No.: US 12,719,634 B2
(45) Date of Patent: Aug. 25, 2026

(54) CELL DRX IMPACT REFERENCE SIGNALS FOR POSITIONING AND SENSING

(71) Applicant: QUALCOMM Incorporated, San Diego, CA (US)

(72) Inventors: Marwen Zorgui, San Diego, CA (US); Mohammed Ali Mohammed Hirzallah, San Diego, CA (US); Ahmed Attia Abotabl, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 435 days.

(21) Appl. No.: 18/340,785

(22) Filed: Jun. 23, 2023

(65) Prior Publication Data

US 2024/0430059 A1 Dec. 26, 2024

(51) Int. Cl.
*H04L 5/00* (2006.01)
*H04W 64/00* (2009.01)
*H04W 76/28* (2018.01)

(52) U.S. Cl.
CPC .......... *H04L 5/0051* (2013.01); *H04L 5/0007* (2013.01); *H04W 64/00* (2013.01); *H04W 76/28* (2018.02)

(58) Field of Classification Search
None
See application file for complete search history.

(56) References Cited

U.S. PATENT DOCUMENTS

2021/0050978 A1* 2/2021 Manolakos ........... H04L 5/0051
2021/0384949 A1* 12/2021 Kumar .................. H04W 76/15
2023/0283425 A1* 9/2023 Kazmi .................. H04L 5/0048 370/329

FOREIGN PATENT DOCUMENTS

EP 4123942 A1 1/2023
WO 2021029934 A1 2/2021
WO 2021231385 A1 11/2021
WO 2022031682 A1 2/2022

OTHER PUBLICATIONS

International Search Report and Written Opinion—PCT/US2024/026967—ISA/EPO—Sep. 4, 2024.

* cited by examiner

*Primary Examiner* — Suhail Khan
(74) *Attorney, Agent, or Firm* — Procopio, Cory, Hargreaves & Savitch LLP

(57) ABSTRACT

Apparatuses and methods for cell DRX impact reference signals for positioning and sensing are described. An apparatus is configured to receive, from a network entity, an UL reference signal configuration indication. The UL reference signal configuration associates a UL reference signal transmission occasions set with active/inactive DRX modes of a cell(s) associated with a UE. The apparatus is configured to provide, for a TRP(s) associated with the cell(s), and at the set of UL reference signal transmission occasions, an UL reference signal(s) during a portion of the active DRX mode based on the UL reference signal configuration. Another apparatus is configured to configure, for a UE, an UL reference signal configuration that associates UL reference signal transmission occasions with active/inactive DRX modes of a cell(s) associated with the UE. The apparatus is configured to provide, for the UE, the UL reference signal configuration.

30 Claims, 13 Drawing Sheets

200
One Frame (TDD)
10 ms
subframe
slot
RB
subcarrier
OFDM symbol
DMRS R
CSI-RS

230
PDCCH CORESET
SSS
PSS
PDSCH
PBCH
REG 12 REs
1 CCE = 6 REGs
SS/PBCH Block
BWP
20 RBs
channel bandwidth RBs 250
One Frame (TDD)
10 ms
subframe
slot
RB
subcarrier
OFDM symbol
SRS
SRS Comb 0
SRS Comb 1
DMRS R

280
PUCCH
PUSCH 1100
1104
Cellular Baseband
Processor(s)
(Modem)
1124
Component
198
Memory
1124'
Application Processor(s)
1106
1106'
Memory
Component
198
SD Card
1108
Screen
1110
Bluetooth
1112
TRX
WLAN
1114
TRX
SPS
1116
TRX
Camera
1132
Sensor(s)
1118
Memory
1126
Power Supply
1130
SIM Card(s)
1120
Transceiver(s)
1122
Antennas
1180
104
1102
CU
DU
RU

CELL DRX IMPACT REFERENCE SIGNALS FOR POSITIONING AND SENSING

TECHNICAL FIELD

The present disclosure relates generally to communication systems, and more particularly, to wireless communications utilizing positioning and sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus, which may comprise a user equipment (UE), is configured to receive, from a network entity, an indication of an uplink (UL) reference signal configuration, where the UL reference signal configuration associates a set of UL reference signal transmission occasions with an active discontinuous reception (DRX) mode and an inactive DRX mode of at least one cell associated with the UE. The apparatus is also configured to provide, for at least one transmit-receive point (TRP) associated with the at least one cell, and at the set of UL reference signal transmission occasions, at least one UL reference signal during a portion of the active DRX mode based on the UL reference signal configuration.

In the aspect, the method includes receiving, from a network entity, an indication of an UL reference signal configuration, where the UL reference signal configuration associates a set of UL reference signal transmission occasions with an active DRX mode and an inactive DRX mode of at least one cell associated with the UE. The method also includes providing, for at least one TRP associated with the at least one cell, and at the set of UL reference signal transmission occasions, at least one UL reference signal during a portion of the active DRX mode based on the UL reference signal configuration.

In another aspect of the disclosure, a method, a computer-readable medium, and an apparatus are provided. The apparatus is configured to configure, for a UE, an UL reference signal configuration, where the UL reference signal configuration associates a set of UL reference signal transmission occasions with an active DRX mode and an inactive DRX mode of at least one cell associated with the UE. The apparatus is also configured to provide, for the UE, an indication of the UL reference signal configuration.

In the aspect, the method includes configuring, for a UE, an UL reference signal configuration, where the UL reference signal configuration associates a set of UL reference signal transmission occasions with an active DRX mode and an inactive DRX mode of at least one cell associated with the UE. The method also includes providing, for the UE, an indication of the UL reference signal configuration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
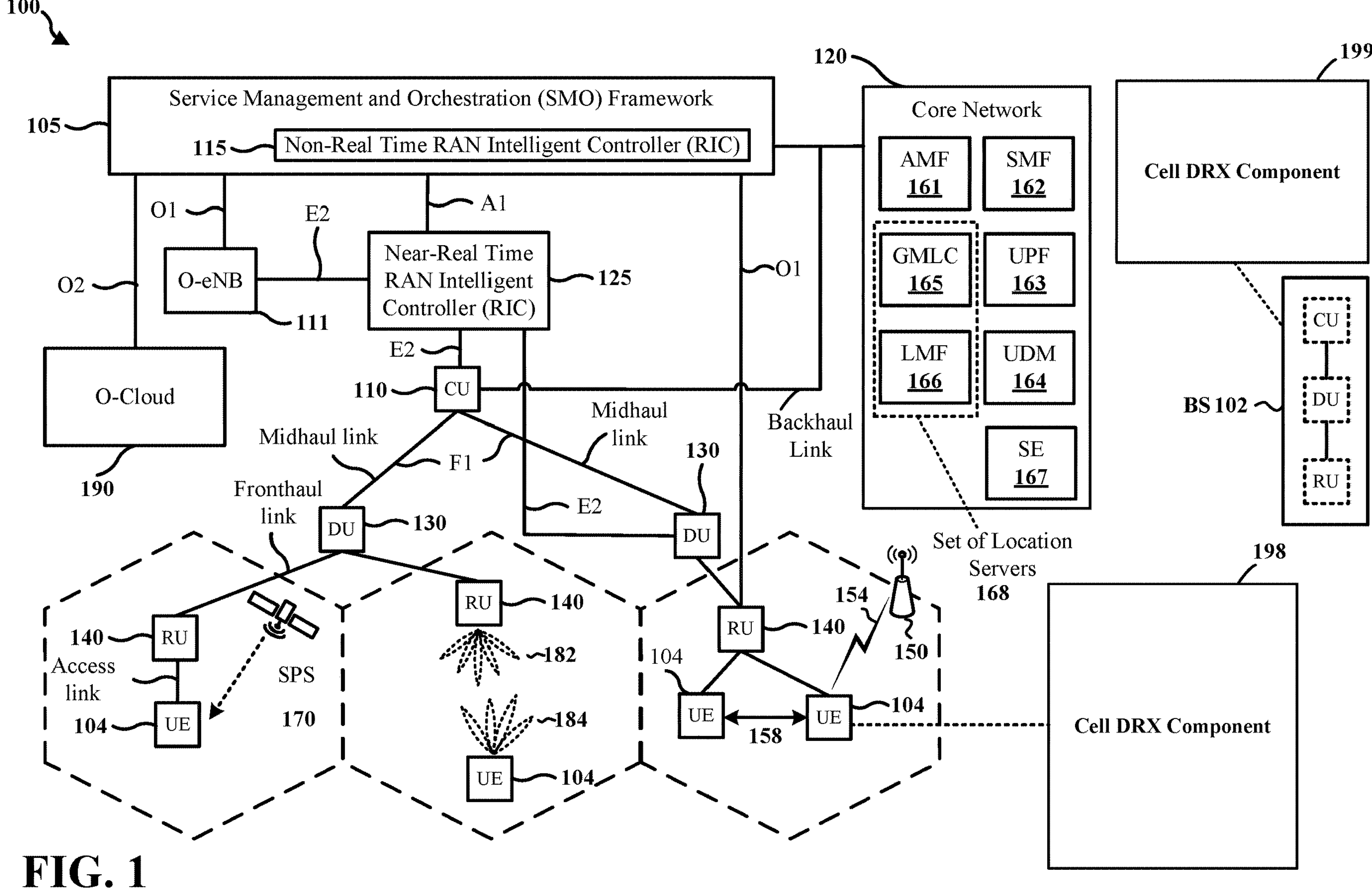
FIG. 1 is a diagram illustrating an example of a wireless communications system and an access network.

Wireless communication networks, such as 5G NR, may enable wireless devices to perform positioning and sensing operations. Wireless devices and TRPs may also operate in modes associated with DRX and discontinuous transmission (DTX), such as for UE DRX cycles and cell DTX/DRX cycles, in which a UE and/or TRP may monitor for/transmit control signaling such as a physical downlink control channel (PDCCH) and/or data channels such as a physical downlink shared channel (PDSCH) discontinuously using an ON and OFF pattern (e.g., e.g., an active DRX mode and an inactive DRX mode). Wireless device and/or TRP power may be conserved through DRX operations. As an example, PDCCH skipping may be utilized in which a UE receives downlink control information (DCI) that schedule uplink or downlink communications and that includes indications to skip physical downlink control channel (PDCCH) monitoring for a duration of time. Similarly, a TRP may operate in an inactive DRX mode during which reception of wireless signals is not performed.

However, misalignment between various UE DRX cycles and cell DRX cycles (of a TRP) may not allow different wireless signals to be transmitted/received and may degrade or impair positioning (e.g., sounding reference signals (SRS) for positioning (SRS-positioning or SRS-pos)) and sensing operations. As another example, inter-node information exchange between TRPs and/or other network devices may be degraded or impaired. Likewise, changes to UE DRX cycles and/or cell DRX cycles may affect synchronization signal block (SSB) transmissions or impact idle/inactive UEs.

Various aspects relate generally to wireless communications utilizing positioning and sensing. Some aspects more specifically relate to cell DRX impact on reference signals for positioning and sensing. In one example, a UE may receive, from a network entity, an indication of an UL reference signal configuration, where the UL reference signal configuration associates a set of UL reference signal transmission occasions with an active DRX mode and an inactive DRX mode of at least one cell associated with the UE. The UE may also provide, for at least one TRP associated with the at least one cell, and at the set of UL reference signal transmission occasions, at least one UL reference signal during a portion of the active DRX mode based on the UL reference signal configuration. The UE may, where the UL reference signal configuration indicates dropping criteria associated with UL resources for the at least one UL reference signal, drop an UL resource at one of the set of UL reference signal transmission occasions based on the dropping criteria. The UE may provide, for the network entity, at least one DRX information request corresponding to the at least one cell associated with the UE, and may receive, from the network entity based on the at least one DRX information request, at least one DRX configuration corresponding to the at least one cell associated with the UE. In another example, a network entity may configure, for a UE, an UL reference signal configuration, where the UL reference signal configuration associates UL reference signal transmission occasions with an active DRX mode and an inactive DRX mode of at least one cell associated with the UE. The network entity may also provide, for the UE, the UL reference signal configuration. The network entity may receive, from the UE and at the set of UL reference signal transmission occasions, at least one UL reference signal during a portion of the active DRX mode, where the network entity is a network node. The network entity may transmit, for at least one of a location management function (LMF) or a sensing entity, at least one of: an indication of an inactive DRX mode, associated with the at least one cell associated with the UE, that corresponds to the empty portion associated with the dropped UL resource at one of the set of UL reference signal transmission occasions based on the dropping criteria; or at least one DRX cycle, associated with the at least one cell, that overlaps with at least one UL positioning reference signal of the UE. The network entity may receive, from the UE, at least one DRX information request corresponding to the at least one cell associated with the UE, and may provide, for the UE based on the at least one DRX information request, at least one DRX configuration corresponding to the at least one cell associated with the UE.

Particular aspects of the subject matter described in this disclosure can be implemented to realize one or more of the following potential advantages. In one example, by configuring and regulating UE UL positioning and cell DRX operations, the described techniques can be used to improve positioning/sensing operations and intra-node information exchange for TRPs. In another example, by providing an extensible framework for configuring and regulating UE UL positioning and cell DRX operations, the described techniques can be used to improve positioning operations using different UL reference signals positioning/sensing operations. In an additional example, by providing dynamic adaptation of DRX configurations and cycles, the described techniques can be used to improve cell/TRP power consumption while still providing sufficient signaling for positioning/sensing operations and intra-node information exchange for TRPs.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2. FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities, such as a sensing entity (SE) 167. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors. The SE 167 may be configured as a sensing counterpart to the LMF 166, that may be configured to coordinate sensing sessions such as those performed by UEs and/or base stations/TRPs.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a cell DRX component 198 ("component 198") that may be configured to receive, from a network entity, an indication of an UL reference signal configuration, where the UL reference signal configuration associates a set of UL reference signal transmission occasions with an active DRX mode and an inactive DRX mode of at least one cell associated with the UE. The component 198 may also be configured to provide, for at least one TRP associated with the at least one cell, and at the set of UL reference signal transmission occasions, at least one UL reference signal during a portion of the active DRX mode based on the UL reference signal configuration. The component 198 may be configured, where the UL reference signal configuration indicates dropping criteria associated with UL resources for the at least one UL reference signal, to drop an UL resource at one of the set of UL reference signal transmission occasions based on the dropping criteria. The component 198 may be configured to provide, for the network entity, at least one DRX information request corresponding to the at least one cell associated with the UE, and configured to receive, from the network entity based on the at least one DRX information request, at least one DRX configuration corresponding to the at least one cell associated with the UE. In certain aspects, the base station 102 may have a cell DRX component 199 ("component 199") that may be configured to configure, for a UE, an UL reference signal configuration, where the UL reference signal configuration associates UL reference signal transmission occasions with an active DRX mode and an inactive DRX mode of at least one cell associated with the UE. The component 199 may also be configured to provide, for the UE, the UL reference signal configuration. The component 199 may be configured to receive, from the UE and at the set of UL reference signal transmission occasions, at least one UL reference signal during a portion of the active DRX mode, where the network entity is a network node. The component 199 may be configured to transmit, for at least one of a location management function (LMF) or a sensing entity, at least one of: an indication of an inactive DRX mode, associated with the at least one cell associated with the UE, that corresponds to the empty portion associated with the dropped UL resource at one of the set of UL reference signal transmission occasions based on the dropping criteria; or at least one DRX cycle, associated with the at least one cell, that overlaps with at least one UL positioning reference signal of the UE. The component 199 may be configured to receive, from the UE, at least one DRX information request corresponding to the at least one cell associated with the UE, and may provide, for the UE based on the at least one DRX information request, at least one DRX configuration corresponding to the at least one cell associated with the UE. Accordingly, the aspects herein for cell DRX impact reference signals for positioning and sensing may allow for improved positioning/sensing operations and intra-node information exchange for TRPs by configuring and regulating UE UL positioning and cell DRX operations, for improved positioning operations using different UL reference signals positioning/sensing operations by providing an extensible framework for configuring and regulating UE UL positioning and cell DRX operations, and for improved cell/TRP power consumption while still providing sufficient signaling for positioning/sensing operations and intra-node information exchange for TRPs by providing dynamic adaptation of DRX configurations and cycles.

Figures 2A, 2B, 2C, 2D:
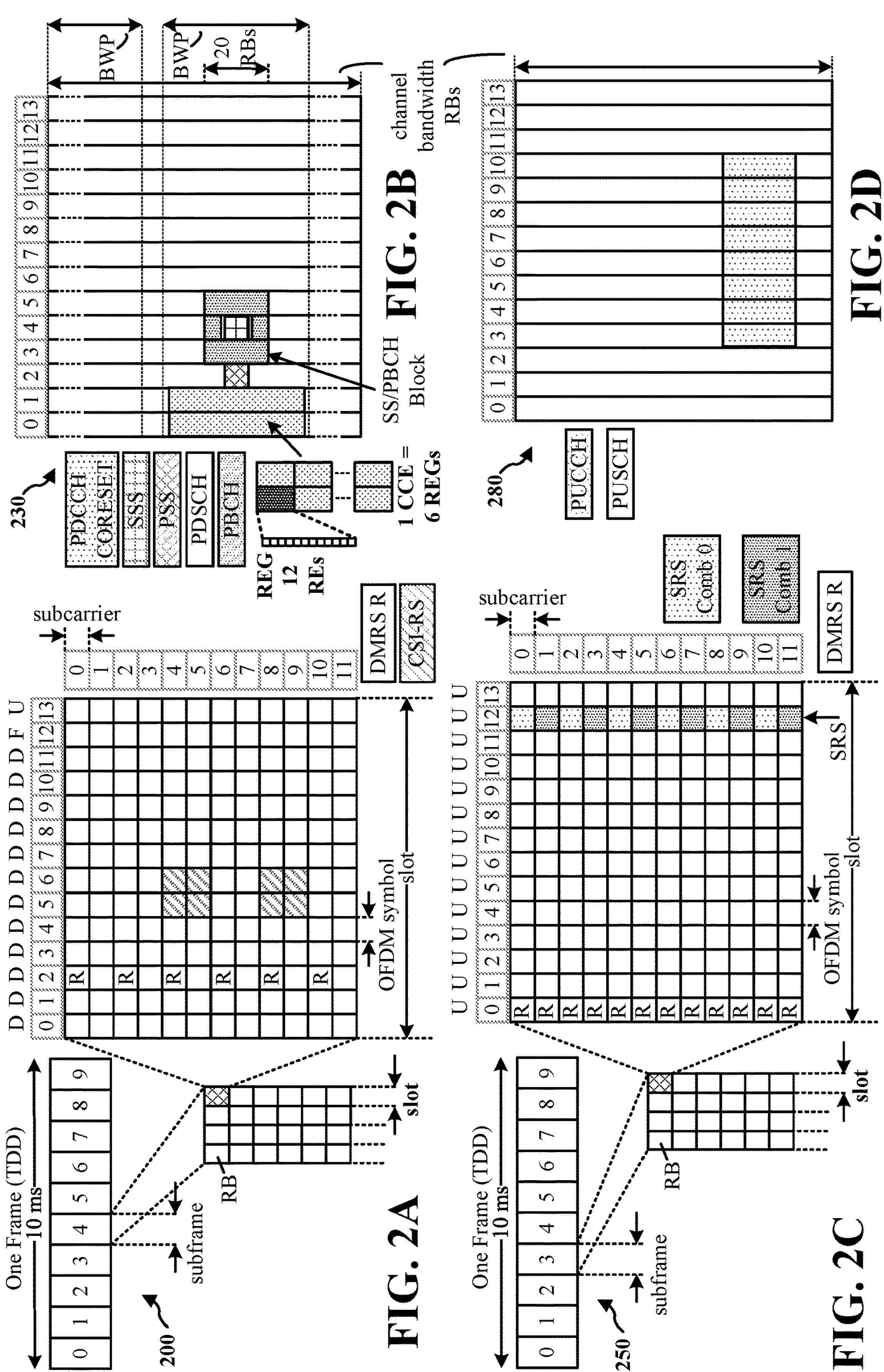
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
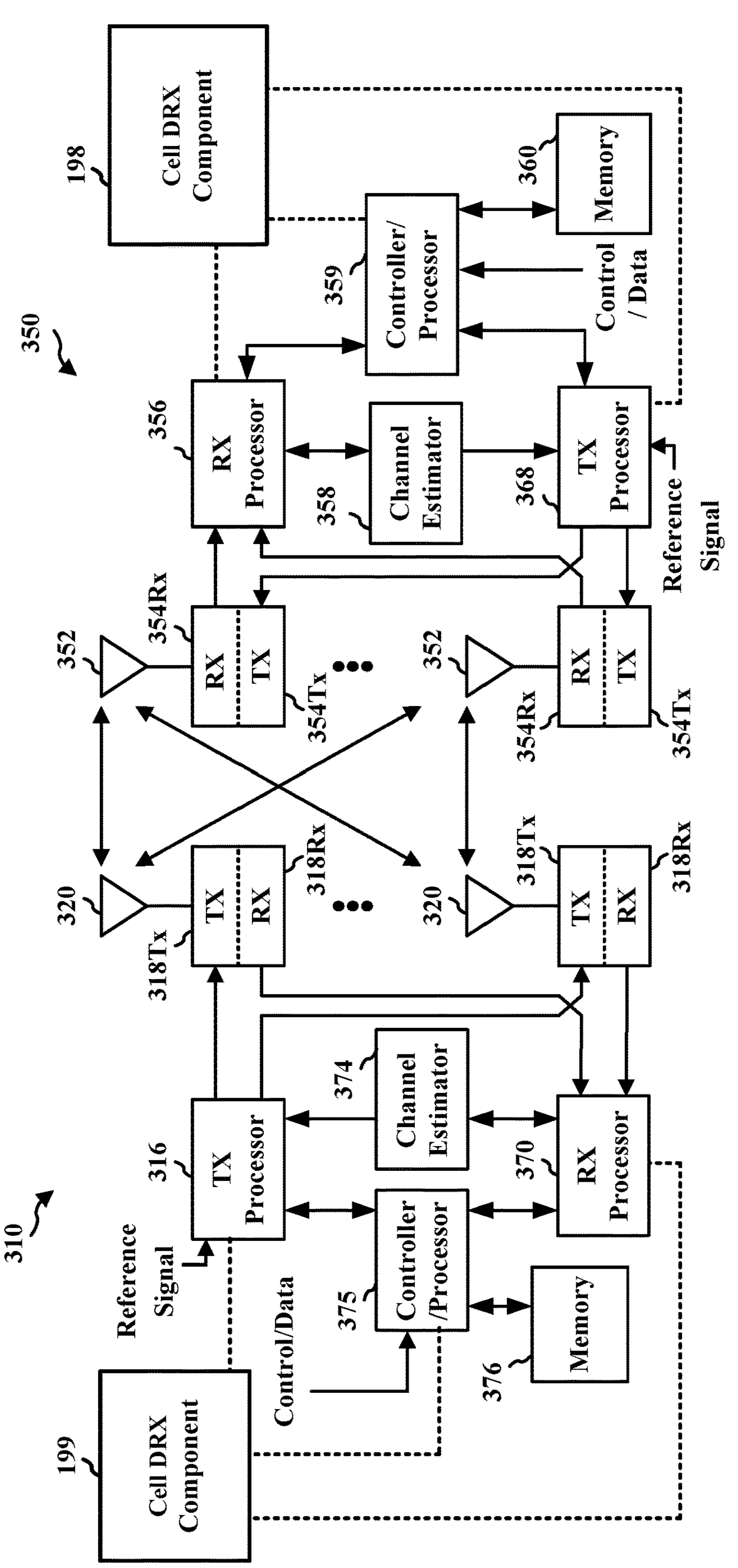
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the component 198 of FIG. 1. At least one of the TX processor 316, the RX processor 370, and the controller/processor 375 may be configured to perform aspects in connection with the component 199 of FIG. 1.

Figure 4:
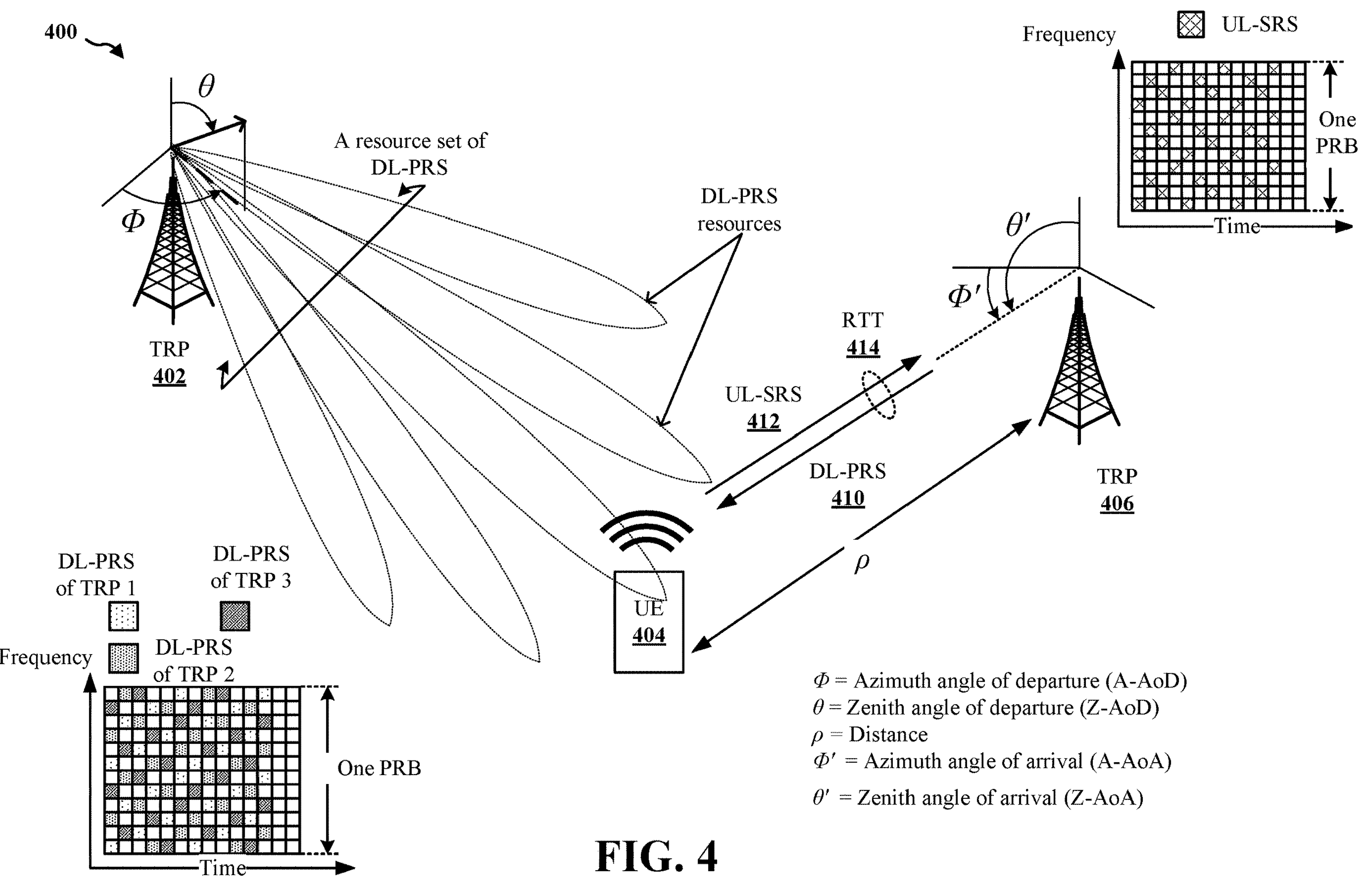
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In addition to network-based UE positioning technologies, a wireless device (e.g., a UE, an AP, etc.) may also be configured to include sensing capabilities, where the wireless device may be able to sense (e.g., detect and/or track) one or more objects or target entities of an area or in an environment, including users and other people, based on radio frequencies/radio detection and ranging (RADAR). To perform RF sensing or RADAR, a transmitting node (e.g., a UE transmitting UE SRS) may not also be the receiving node. When the transmitter device is the same as the receiver device, this may be referred to as monostatic RADAR/RF sensing. When the transmitter device and the receiver device are different (e.g., located in different places), this may be referred to as bistatic RADAR/RF sensing. Aspects herein contemplate implementations for both of monostatic and bistatic RADAR/RF sensing. An environment may refer to a particular geographical area or place, especially as affected by human activity, or the circumstances, objects, or conditions by which one is surrounded. For example, a wireless device may include a RADAR capability (which may be referred to as "RF sensing" and/or "cellular-based RF sensing), where the wireless device may transmit reference signals (e.g., RADAR reference signals (RRSs)) and measure the reference signals reflected from one or more objects (e.g., structures, walls, living objects, poses/gestures of users, and/or other things in an environment, etc.). Based on the measurement, the wireless device may determine or estimate a distance between the wireless device and the one or more objects and/or obtain environmental information associated with its surrounding including, but without limitation, range, Doppler, and/or angle information of sensing target entities. In another example, a first wireless device may receive signals transmitted from a second wireless device, where the first wireless device may determine or estimate a distance between the first wireless device and the second wireless device based on the received signals. For example, a tracking device (e.g., a Bluetooth™ tracker, an item tracker, an asset tracking device, etc.) may be configured to regularly transmit signals (e.g., beacon signals) or small amounts of data to a receiving device, such that the receiving device may be able to monitor the location or the relative distance of the tracking device. As such, a user may be able to track the location of an item (e.g., a car key, a wallet, a remote control, etc.) by attaching the tracking device to the item. For purposes of the present disclosure, a device/apparatus that is capable of performing sensing (e.g., transmitting and/or receiving signals for detecting at least one object or for estimating the distance between the device and the at least one object) may be referred to as a "sensing device," a "sensing node," or a "sensing entity." For example, a sensing device may be a UE, an AP device (e.g., a Wi-Fi router), a base station, a component of the base station, a TRP, a device capable of performing RADAR functions, etc. Furthermore, a target entity may be any object (e.g., a person, a vehicle, a UE, etc.) for which a positioning or sensing session is performed, for example, to determine a location thereof, a velocity thereof, a heading thereof, a physiological characteristic thereof, etc. In addition, a device/apparatus that is capable of transmitting signals to a sensing device for the sensing device to determine the location or the relative distance of the device/apparatus may be referred to as a "tracking device," a "tracker," or a "tag."

For purposes of the present disclosure, a positioning session may be referred to the transmitting, the receiving, and the measuring of reference signals for the purposes of determining a positioning result or state (e.g., a location, a heading, a velocity, etc.) of a target entity. A sensing session may be referred to the transmitting, the receiving, and the measuring of reference signals for the purposes of determining a sensing result or state of an environment in which the target entity is included (e.g., a change in the environment), at least one physiological characteristic of a target entity, a location of the target entity, a velocity of the target entity, a heading of the target entity, etc. A sensing session may be performed over one or more sensing occasions, where an individual sensing occasion may be a length of time in which sensing resources (e.g., frequency-modulated continuous wave (FMCW) bandwidth, OFDM bandwidth, etc.) may be available for sensing operations.

Wireless devices in wireless networks may perform positioning and sensing operations. Wireless devices and TRPs may also operate in modes associated with DRX, such as for UE DRX cycles and cell DRX cycles, in which a UE and/or TRP may monitor for/transmit control signaling such as a PDCCH discontinuously using an ON and OFF pattern (e.g., e.g., an active DRX mode and an inactive DRX mode). Wireless device and/or TRP power may be conserved through DRX operations. As an example, PDCCH skipping may be utilized in which a UE receives DCI that schedule uplink or downlink communications and that includes indications to skip PDCCH monitoring for a duration of time. Similarly, a TRP may operate in an inactive DRX mode during which reception of wireless signals is not performed. However, misalignment between various UE DRX cycles and cell DRX cycles (of a TRP) may not allow different wireless signals to be transmitted/received and may degrade or impair positioning (e.g., SRS for positioning) and sensing operations. As another example, inter-node information exchange between TRPs and/or other network devices may be degraded or impaired. Likewise, changes to UE DRX cycles and/or cell DRX cycles may affect SSB transmissions or impact idle/inactive UEs.

Various aspects herein for cell DRX impact reference signals for positioning and sensing may improve positioning/sensing operations and intra-node information exchange for TRPs by configuring and regulating UE UL positioning and cell DRX operations. Aspects may improve positioning operations using different UL reference signals positioning/sensing operations by providing an extensible framework for configuring and regulating UE UL positioning and cell DRX operations. Aspects may also improve cell/TRP power consumption while still providing sufficient signaling for positioning/sensing operations and intra-node information exchange for TRPs by providing dynamic adaptation of DRX configurations and cycles.

Aspects provide configurations and rules regulating the UL SRS-positioning and cell DRX operations to improve DTX/DRX mechanism. In one aspect, the UE transmits all UL SRS-positioning (SRS-pos) transmissions regardless of the cell DRX mode (e.g., for active/ON as well as inactive/OFF modes). In one aspect, the UE may drop the SRS-pos resource if a certain cell is in a DRX OFF/inactive mode and unable to receive. Additionally, the UE may also drop the SRS-pos resource if the number of cells in DRX ON/active mode is less than a threshold and unable to receive. In other aspects, the UE may drop the SRS-pos resource if the SRS-pos quasi-co-location (QCL) relationship is defined with respect to a set of cells such that a subset of the cells may be in the DRX OFF/inactive mode. In some aspects, "drop" may refer to "delete." "remove." or "not transmit" such that "dropping" a resource may refer to "deleting," "removing." or "not transmitting" a resource.

Further, it should be noted that while aspects may be described in terms of specific reference signaling and/or resources (e.g., SRS-positioning), such description is by way of example for illustration of aspects, and is not to be considered limited. That is, any configured UL reference signals that may be used for positioning and/or RF sensing are contemplated herein for various aspects.

Figure 5:
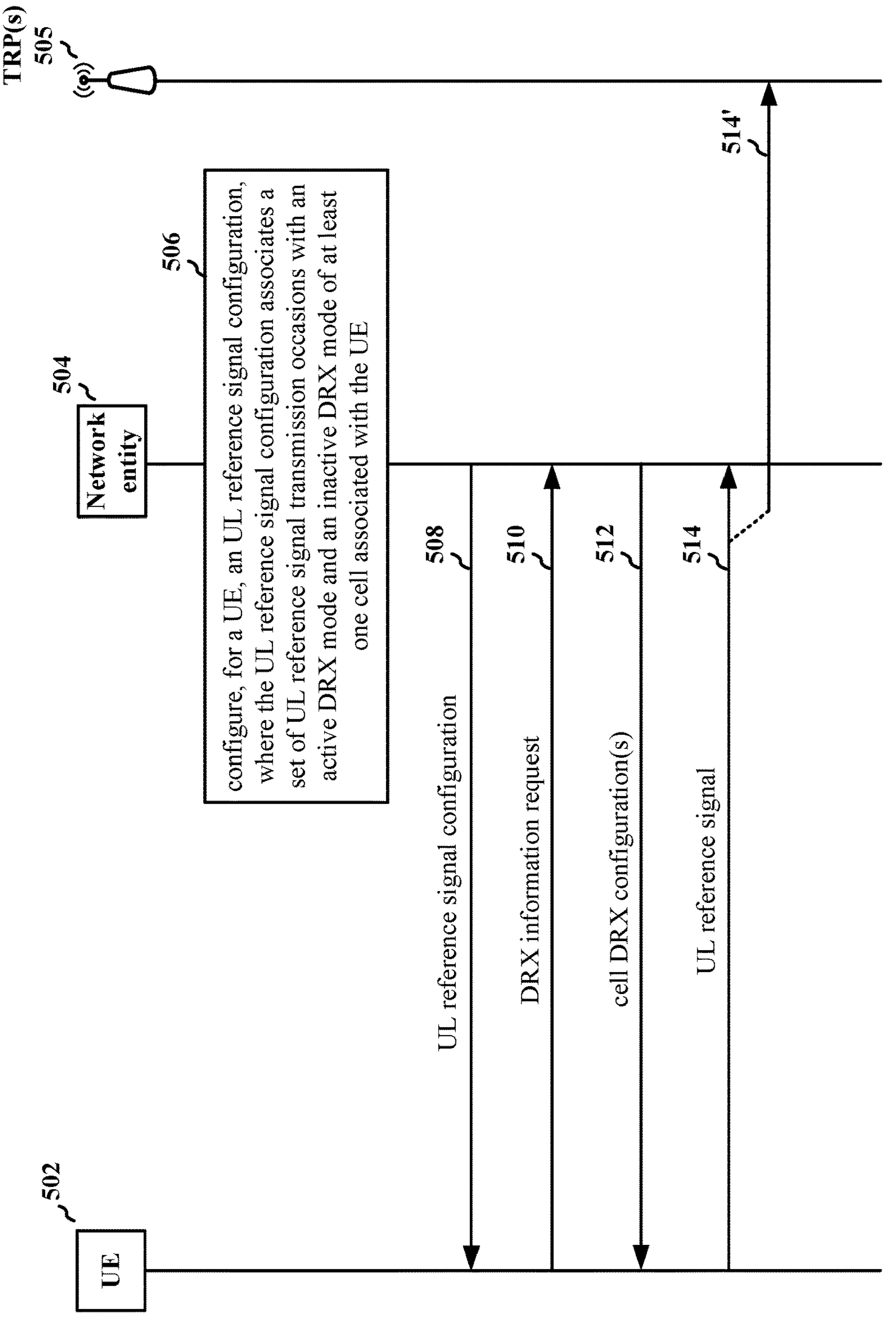
FIG. 5 is a call flow diagram for wireless communications, in accordance with various aspects of the present disclosure.

FIG. 5 is a call flow diagram 500 for wireless communications, in various aspects. Call flow diagram 500 illustrates cell DRX impact reference signals for positioning and sensing by a UE (e.g., a UE 502) that may communicate with a network entity (e.g., a network entity 504), which may operate in cell DRX active/inactive modes. As described herein, a network entity may be, without limitation, a base station, a gNB or other type of base station, a LMF, a sensing entity (SE), and/or the like, including portions thereof. In aspects, a core network (e.g., the core network 120 in FIG. 1) may include the sensing entity (e.g., a SE 167), which may be a sensing counterpart to the LMF 166, that may be configured to coordinate sensing sessions such as those performed by UEs and/or base stations/TRPs. The network entity 504 may also communicate with other network entities, and the UE 502 may also communicate with a TRP(s) 505 (e.g., a base station(s), a gNB(S) or other type of base station(s), an AP(s), a repeater(s), and/or the like) in association with cell DRX impact reference signals for positioning and sensing. Aspects described for the network entities/base stations may be performed by the network entities/base stations in aggregated form and/or by one or more components thereof in disaggregated form. Additionally, or alternatively, the aspects may be performed by the UE 502 autonomously, in addition to, and/or in lieu of, operations of the network entities/base stations.

In the illustrated aspect, the network entity 504 may be configured to configure (at 506), for the UE 502, an UL reference signal configuration 508, where the UL reference signal configuration 508 associates a set of UL reference signal transmission occasions with an active DRX mode and an inactive DRX mode of at least one cell associated with the UE 502. In aspects, an UL reference signal may be, without limitation, a SRS for positioning (SRS-pos), a demodulation reference signal (DMRS), and/or the like.

In aspects, the UL reference signal configuration 508 may include dropping criteria, described in further detail herein, by which the UE 502 may be configured to schedule and/or drop UL resources for UL reference signals based on a cell DRX configuration(s) 512 and measurement/transmit occasions for UL reference signals overlapping with the DRX active/inactive mode portions for cells' DRX cycles. The network entity 504 may be configured to provide/transmit the UL reference signal configuration 508 to the UE 502. The UL reference signal configuration 508 may be provided/transmitted by the network entity 504 and received by the UE 502 using RRC signaling.

The UE 502 may be associated with one or more cells, such as a serving cell, one or more neighbor cells, and/or the like. Such cells may include one or more TRPs. e.g., the TRP(s) 505, the network entity 504 (e.g., as a base station or the like), etc., and these TRPs may be associated with respective configurations of the cell DRX configuration(s) 512. The cell DRX configuration(s) 512 may indicate times and/or durations of active DRX modes and inactive DRX modes for the TRP(s) 505 that can be utilized by the UE 502 for UL resource timing/dropping determinations in UL reference signal transmissions. Accordingly, the UE 502 may be configured to provide/transmit, for reception by the network entity 504, a DRX information request 510. The DRX information request 510 may include or be at least one DRX information request and may correspond to at least one cell associated with the UE 502 (e.g., for the TRP(s) 505).

The network entity 504 may be configured to acquire/maintain the cell DRX configuration(s) 512 for the TRP(s) 505 and cells associated with the UE 502, and based on the DRX information request 510, the network entity 504 may be configured to provide/transmit the cell DRX configuration(s) 512, which may be received by the UE 502. In aspects, the cell DRX configuration(s) 512 may correspond to at least one cell associated with the UE (e.g., base stations, TRPs, APs, etc., for a serving cell/neighboring cells) and may be included in at least one of a dedicated positioning SIB, a sensing SIB, a radio resource management (RRM) SIB, a medium access control (MAC) control element (MAC-CE), downlink control information (DCI), a RRC signaling configuration, a long term evolution (LTE) positioning protocol (LPP) message, assistance information, and/or the like. In aspects, the cell DRX configuration(s) 512 may correspond to at least one cell associated with the UE (e.g., base stations, TRPs, APs, etc., for a serving cell/neighboring cells) and may be provided in response to the DRX information request 510 (or requests) corresponding to a cell(s) associated with the UE 502 (e.g., the TRP(s) 505 and/or the network entity 504).

The UE 502 may thus be configured to provide/transmit an UL reference signal 514 to the network entity 504 and/or an UL reference signal 514' to at least one of the TRP(s) 505 according to the UL reference signal configuration 508 and/or the cell DRX configuration(s) 512, at a set of UL reference signal transmission occasions for the UE 502 and during a portion of the active DRX mode and/or the inactive DRX mode for one or more of the network entity 504/TRP(s) 505, according to aspects herein. The UL reference signal 514 and/or the UL reference signal 514' may include position measurement data of the UE 502 for performance of positioning operations, sensing operations, and/or the like.

Figure 6:
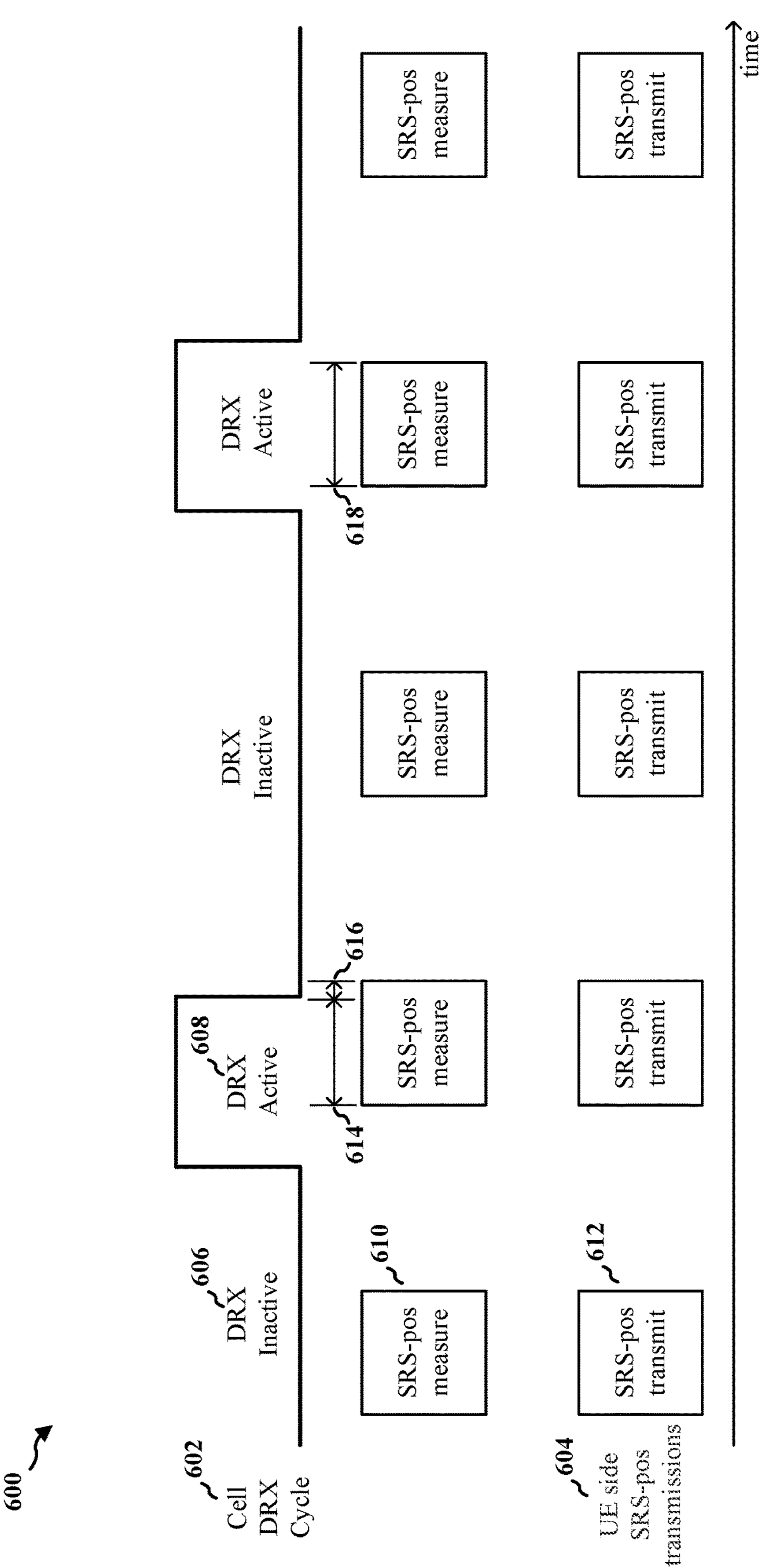
FIG. 6 is a diagram illustrating examples of cell DRX cycles and UE reference signaling, in accordance with various aspects of the present disclosure.

FIG. 6 is a diagram 600 illustrating examples of cell DRX cycles and UE reference signaling, in various aspects. Aspects herein may provide for a UE to transmit all UL reference signals (e.g., SRS-positioning transmissions) regardless of cell DRX mode. That is, the cell DRX may not impact the behavior of SRS transmissions, in aspects, and SRS transmissions and/or the like may occur regardless of whether a given cell is in an active DRX mode or an inactive DRX mode, and may be applied for all cells associated with the UE (e.g., serving and neighbor cells). Diagram 600 shows a cell DRX cycle 602, e.g., for a base station/TRP, and UE-side reference signaling 604 (SRS-pos transmissions, by way of example).

The cell DRX cycle illustrated includes DRX inactive portions 606 and DRX active portions 608, which may be periodic, semi-periodic, etc. During the DRX inactive portions 606, a cell's base stations/TRPs may be in an inactive DRX mode in which reception of signals is not performed, e.g., to conserve power, while during the DRX active portions 608, a cell's base stations/TRPs may be in an active DRX mode in which reception of signals is performed.

At the UE-side, a UE may perform reference signal measurements (SRS-pos measurements shown, by way of example) at measurement occasions 610 for transmission of UL reference signals (SRS-pos signaling shown, by way of example) at transmit occasions 612. As illustrated, the DRX active portions 608 may or may not coincide with the measurement occasions 610 and/or the transmit occasions 612. In some scenarios, based on the periodicity/duration of the cell DRX cycle 602 and the UE-side reference signaling 604, a portion (e.g., all or less than all) of an occasion(s) for the measurement occasions 610 and/or the transmit occasions 612 may overlap with the DRX active portions 608, while another portion of the occasion(s) for the measurement occasions 610 and/or the transmit occasions 612 may be outside of the overlap with the DRX active portions 608 and overlap with the DRX inactive portions 606.

In aspects, examples of overlaps between a portion of an occasion(s) for the measurement occasions 610 and/or the transmit occasions 612 and the DRX active portions 608 are shown as an overlap duration 614 (e.g., a portion that is less than all of an occasion overlaps with the DRX active portions 608) and an overlap duration 618 (e.g., a portion that is all of an occasion overlaps with the DRX active portions 608). Conversely, aspects also provide for an overlap duration 616 that is outside of the overlap duration 614 for the DRX active portions 608. That is, the overlap duration 616 illustrates a portion of an occasion(s) for the measurement occasions 610 and/or the transmit occasions 612 and the DRX inactive portions 606.

When considering cell DRX cycles for multiple cells, the overlap durations of measurement occasions and/or transmit occasions with DRX active/inactive portions of the cells' DRX cycles may become more complex and/or narrow. Aspects herein improve such issues by enabling measurement occasions 610 and/or the transmit occasions 612 for a UE to be performed during either or both of the DRX inactive portions 606 and/or the DRX active portions 608. In this way, even considering that some cells associated with a UE may be operating in an inactive DRX mode based on the cell DRX cycle 602, other cells may be operating in an active DRX mode and are able to receive UL reference signals from the UE.

On the other hand, cell DRX cycles for multiple cells and the complexity for overlap durations of measurement occasions and/or transmit occasions with DRX active/inactive portions of the cells' DRX cycles may cause a UE to inefficiently utilize cell DRX cycles. Accordingly, the aspects herein for cell DRX impact reference signals for positioning and sensing provide for configurations and rules that regulate UL reference signaling and cell DRX operations to account for varied/misaligned cell DRX cycles of different base stations/TRPs (e.g., as noted above for call flow diagram 500 in FIG. 5 (the UL reference signal configuration 508)). In the context of the above, FIG. 7 is now described.

An UL reference signal, e.g., described below as SRS-pos, may typically be meant to be received by multiple TRPs. Whether a UE transmits certain SRS-pos resources may depend on the specific scenario associated with a cell of a given TRP. As one example, if the UE is performing positioning with a single TRP (e.g., AoA plus RTT based positioning), then, if the TRP is not in an active DRX mode during the time the SRS-pos is expected to be transmitted, the transmission of this SRS-pos may not be performed as the TRP will be in sleep RX mode (e.g., this rule may be applied per cell). In another example, if enough, e.g., a specified/configured number, of TRPs will be in active DRX mode during the SRS-pos transmission, the UE may still transmit the SRS-pos as the number of receiving TRPs may be sufficient to perform positioning/sensing operations. In an additional example, for FR2, SRS-pos transmission may typically be directional, and transmissions may be beam-formed toward one or a few TRPs. Thus, an SRS-pos resource(s) for which the intended TRP is in idle/inactive mode may not be transmitted while other SRS-pos resources may be transmitted for TRPs in the active mode (e.g., thus rule may be applied per SRS resource (beam)).

Figure 7:
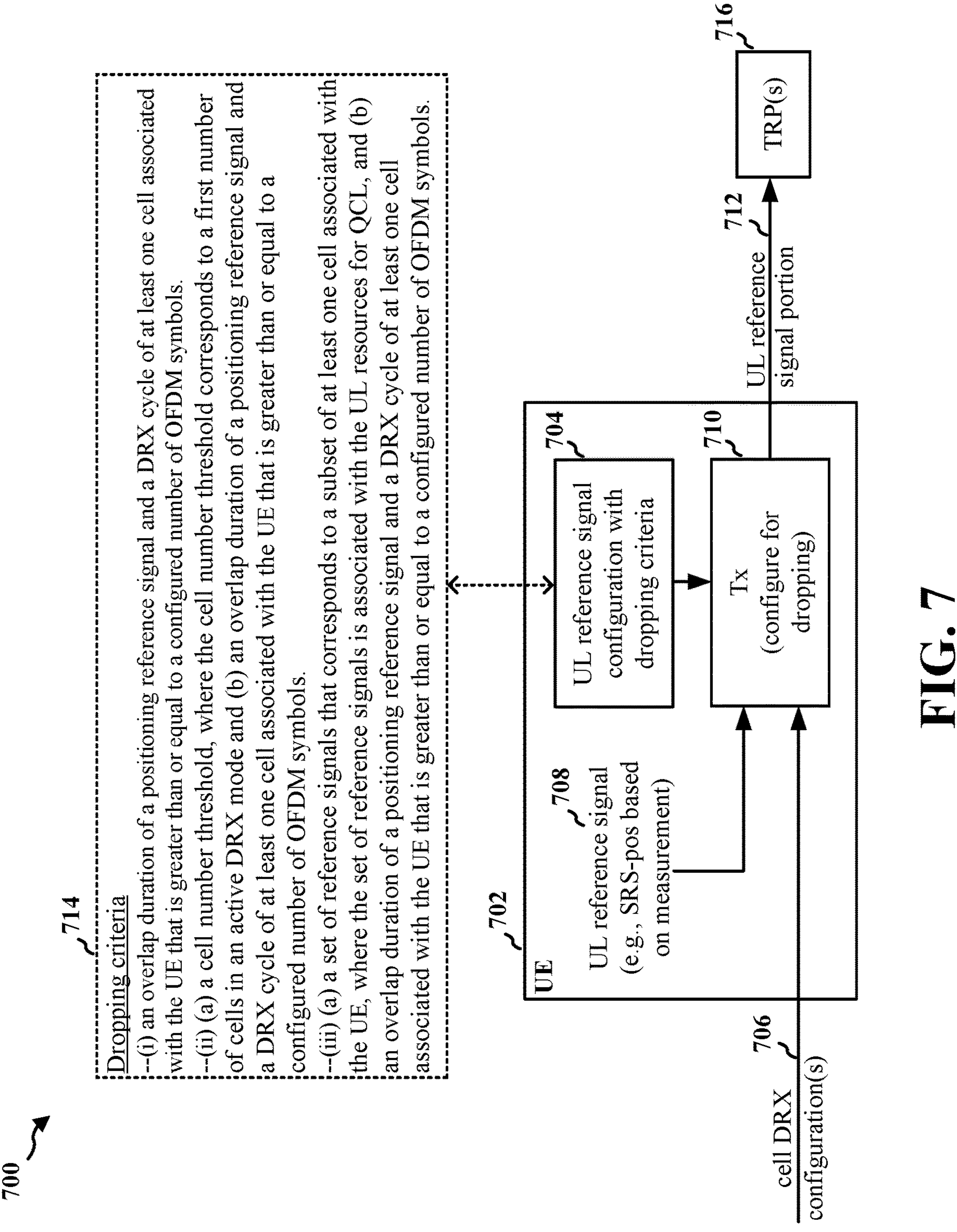
FIG. 7 is a diagram illustrating an example of UE reference signaling based on cell DRX configurations, in accordance with various aspects of the present disclosure.

FIG. 7 is a diagram 700 illustrating an example of UE reference signaling based on cell DRX configurations, in various aspects. Diagram 700 shows a UE 702, which may be a further aspect of the UE 502 in FIG. 5. For instance, the UE 702 may be configured, by a network entity, e.g., such as the network entity 504 in FIG. 5, with an UL reference signal configuration 704. As noted above, an UL reference signal configuration such as the UL reference signal configuration 704 may associate a set of UL reference signal transmission occasions with an active DRX mode and an inactive DRX mode of at least one cell associated with the UE 702 (e.g., for a TRP(s) 716).

The UE 702 may be configured to receive, from the network entity, a cell DRX configuration(s) 706. In aspects, the UL reference signal configuration 704 may include dropping criteria 714 by which the UE 702 may be configured to schedule and/or drop UL resources for UL reference signals based on the cell DRX configuration(s) 706. For example, when the UE 702 desires to schedule an UL reference signal 708 for transmission by a transmitter (Tx) 710, the UE 702 may schedule and transmit an UL reference signal portion 712 for the TRP(s) 716 based on the dropping criteria 714 and the cell DRX configuration(s) 706.

The dropping criteria 714 may indicate, without limitation, (i) an overlap duration of a positioning reference signal and a DRX cycle of at least one cell associated with the UE 702 (e.g., for the TRP(s) 716; e.g., as described above for FIG. 6) that is greater than or equal to a configured number of OFDM symbols. The UE 702 may be configured to drop one or more UL resources of the UL reference signal 708 at one of the set of UL reference signal transmission occasions for each cell of at least one cell associated with the UE 702 (e.g., the TRP(s) 716) that is in the inactive DRX mode and for which the dropping criteria 714 is met. That is, the UE 702 may transmit the overlapping reference signal symbols and may not transmit, or drop, the reference signal symbols that do not overlap.

The dropping criteria 714 may indicate, without limitation, (ii) (a) a cell number threshold, where the cell number threshold corresponds to a first number of cells in an active DRX mode and (b) an overlap duration of a positioning reference signal and a DRX cycle of at least one cell associated with the UE 702 (e.g., for the TRP(s) 716; e.g., as described above for FIG. 6) that is greater than or equal to a configured number of OFDM symbols. The UE 702 may be configured to drop one or more UL resources of the UL reference signal 708 at one of the set of UL reference signal transmission occasions for each cell of the at least one cell associated with the UE (e.g., the TRP(s) 716) that is in the active DRX mode and for which the dropping criteria 714 is met. That is, the UE 702 may transmit all of the overlapping reference signal symbols and may not transmit, or drop, the reference signal symbols that do not overlap, or may transmit all of the mutually exclusive overlapping reference signal symbols and may not transmit, or drop, the reference signal symbols that duplicate another overlap and/or that do not overlap.

The dropping criteria 714 may indicate, without limitation, (iii) (a) a set of reference signals that corresponds to a subset of at least one cell associated with the UE 702 (e.g., for a subset of the TRP(s) 716), where the set of reference signals is associated with the UL resources for QCL, and (b) an overlap duration of a positioning reference signal and a DRX cycle of at least one cell associated with the UE 702 (e.g., for the TRP(s) 716) that is greater than or equal to a configured number of OFDM symbols. The UE 702 may be configured to drop one or more UL resources of the UL reference signal 708 at one of the set of UL reference signal transmission occasions for each cell of the subset of the at least one cell associated with the UE (e.g., a subset of the TRP(s) 716) that is in the active DRX mode and for which the dropping criteria 714 is met. That is, the UE 702 may transmit the overlapping reference signal symbols and may not transmit, or drop, the reference signal symbols that do not overlap.

In some aspects, the UE 702 may be configured to transmit, for the TRP(s) 716, the entirety of the UL reference signal 708 as the UL reference signal portion 712 despite the dropping criteria 714, if so configured by a network entity or based on another UE configuration.

Figure 8:
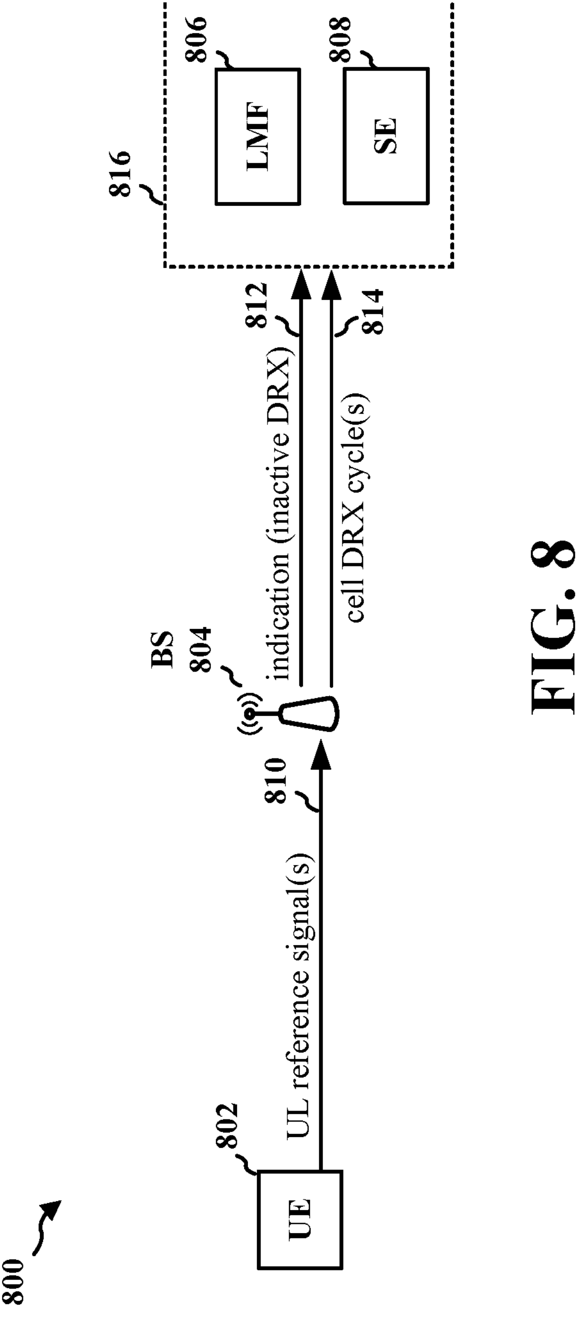
FIG. 8 is a diagram illustrating an example of intra-node information exchange for TRPs, in accordance with various aspects of the present disclosure.

FIG. 8 is a diagram 800 illustrating an example of intra-node information exchange for TRPs, in various aspects. Diagram 800 shows a UE 802 that communicates with a TRP (e.g., a base station 804), where the base station 804 may communicate with one or more of network entities 816 (e.g., at least one of an LMF 806, at least one of an SE 808, and/or the like).

In the illustrated aspect, the UE 802 may be configured to provide/transmit, for the base station 804, an UL reference signal 810 (which may represent more than one signal). In aspects, the UL reference signal may be an SRS-pos, a DMRS, etc., and may include a portion of UL resources that is less than all of the UL resources for a transmit occasion at the UE 802. The base station 804 may be configured to track or accumulate characteristics of the UL reference signal 810, such as but without limitation, dropped resources associated with the UL reference signal 810.

The base station 804 may be configured to transmit, for one or more of the network entities 816, e.g., based on the UL reference signal 810, an indication 812 of an inactive DRX mode associated with at least one cell associated with the UE (e.g., base stations, TRPs, etc., for which the UE 802 communicates UL reference signals, as described herein). The inactive DRX mode may correspond to the empty portions of UL reference signals from the UE 802 associated with dropped UL resources at one of the set of UL reference signal transmission occasions based on a dropping criteria, as noted above, e.g., for FIG. 7. The base station 804 may thus indicate to the LMF 806 and/or the sensing entity (the SE 808) that a DRX OFF/inactive mode is the error reason for the lack of measurements corresponding to the skipped reference signal (e.g., SRS-pos) resource for a given TRP, and the LMF 806/the SE 808 may reconfigure DRX operations or scheduling for a TRP and/or a UE to reduce such errors.

The base station 804 may be configured to transmit, for one or more of the network entities 816, at least one cell DRX cycle 814, associated with at least one cell (e.g., a base station, gNB, TRP, etc. thereof) that is associated with the UE 802, that overlaps with at least one UL positioning reference signal (e.g., the UL reference signal 810) of the UE 802. The at least one cell DRX cycle 814, or indicia therefor, may be provided to the LMF 806 and/or the SE 808 using new radio positioning protocol A (NRPPa) signaling information elements for positioning. As above, the LMF 806/the SE 808 may reconfigure DRX operations or scheduling for a TRP and/or a UE to reduce errors for the lack of measurements corresponding to the skipped reference signal.

Figure 9:
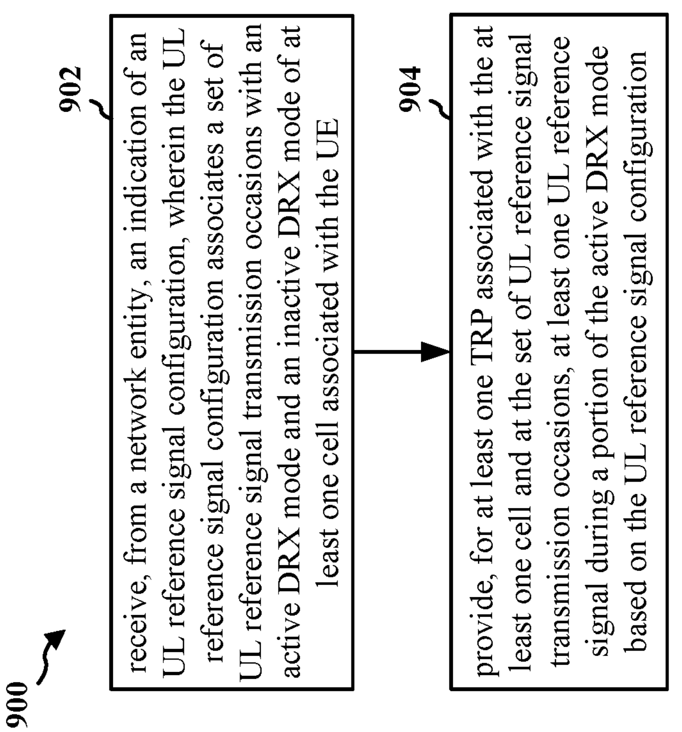
FIG. 9 is a flowchart of a method of wireless communication, in accordance with various aspects of the present disclosure.

FIG. 9 is a flowchart 900 of a method of wireless communication, in various aspects. The method may be performed by a UE (e.g., the UE 104, 502, 702, 802; the apparatus 1104). In some aspects, the method may include aspects described in connection with the communication flow in FIG. 5 and/or aspects described in FIGS. 6-8. The method provides for cell DRX impact reference signals for positioning and sensing may allow for improved positioning/sensing operations and intra-node information exchange for TRPs by configuring and regulating UE UL positioning and cell DRX operations, for improved positioning operations using different UL reference signals positioning/sensing operations by providing an extensible framework for configuring and regulating UE UL positioning and cell DRX operations, and for improved cell/TRP power consumption while still providing sufficient signaling for positioning/sensing operations and intra-node information exchange for TRPs by providing dynamic adaptation of DRX configurations and cycles.

At 902, a UE receives, from a network entity, an indication of an UL reference signal configuration, where the UL reference signal configuration associates a set of UL reference signal transmission occasions with an active DRX mode and an inactive DRX mode of at least one cell associated with the UE. As an example, the reception may be performed, at least in part, by the component 198. FIGS. 5-8 illustrate an example of the UE 502 receiving such an UL reference signal configuration from a network entity (e.g., the network entity 504).

The network entity 504 (e.g., 804, 816 in FIG. 8) may be configured to configure (at 506), for the UE 502, an UL reference signal configuration 508 (e.g., 704 in FIG. 7), where the UL reference signal configuration 508 (e.g., 704 in FIG. 7) associates a set of UL reference signal transmission occasions (e.g., 612 in FIG. 6) with an active DRX mode (e.g., 608 in FIG. 6) and an inactive DRX mode (e.g., 606 in FIG. 6) of at least one cell associated with the UE 502. In aspects, an UL reference signal may be, without limitation, a SRS for positioning (SRS-pos), a demodulation reference signal (DMRS), and/or the like.

In aspects, the UL reference signal configuration 508 (e.g., 704 in FIG. 7) may include dropping criteria (e.g., 714 in FIG. 7), described in further detail herein, by which the UE 502 may be configured to schedule and/or drop (e.g., by Tx 710 in FIG. 7) UL resources for UL reference signals based on a cell DRX configuration(s) 512 (e.g., 706 in FIG. 7) and measurement (e.g., 610 in FIG. 6)/transmit (e.g., 612 in FIG. 6) occasions for UL reference signals overlapping (e.g., 614, 616, 618 in FIG. 6) with the DRX active (e.g., 602 in FIG. 6)/inactive (e.g., 606 in FIG. 6) mode portions for cells' DRX cycles (e.g., 608 in FIG. 6). The network entity 504 (e.g., 804, 816 in FIG. 8) may be configured to provide/transmit the UL reference signal configuration 508 (e.g., 704 in FIG. 7) to the UE 502. The UL reference signal configuration 508 (e.g., 704 in FIG. 7) may be provided/transmitted by the network entity 504 (e.g., 804, 816 in FIG. 8) and received by the UE 502 using RRC signaling.

At 904, the UE provides, for at least one TRP associated with the at least one cell and at the set of UL reference signal transmission occasions, at least one UL reference signal during a portion of the active DRX mode based on the UL reference signal configuration. As an example, the provision may be performed, at least in part, by the component 198. FIGS. 5-8 illustrate an example of the UE 502 providing such an UL reference signal(s) for a TRP (e.g., the network entity 504, the TRP(s) 505).

The UE 502 may be configured to provide/transmit an UL reference signal 514 (e.g., 604 in FIG. 6; 708, 712 in FIG. 7; 810 in FIG. 8) to the network entity 504 (e.g., 804, 816 in FIG. 8) and/or an UL reference signal 514' (e.g., 604 in FIG. 6; 708, 712 in FIG. 7; 810 in FIG. 8) to at least one of the TRP(s) 505 (e.g., 716 in FIG. 7; 804 in FIG. 8) according to the UL reference signal configuration 508 (e.g., 704 in FIG. 7) and/or the cell DRX configuration(s) 512 (e.g., 706 in FIG. 7), at a set of UL reference signal transmission occasions for the UE 502 and during a portion of the active DRX mode (e.g., 608 in FIG. 6) and/or the inactive DRX mode (e.g., 606 in FIG. 6) for one or more of the network entity 504 (e.g., 804, 816 in FIG. 8)/TRP(s) 505 (e.g., 716 in FIG. 7; 804 in FIG. 8), according to aspects herein. The UL reference signal 514 (e.g., 604 in FIG. 6; 708, 712 in FIG. 7; 810 in FIG. 8) and/or the UL reference signal 514' (e.g., 604 in FIG. 6; 708, 712 in FIG. 7; 810 in FIG. 8) may include position measurement data of the UE 502 for performance of positioning operations, sensing operations, and/or the like.

Figure 10:
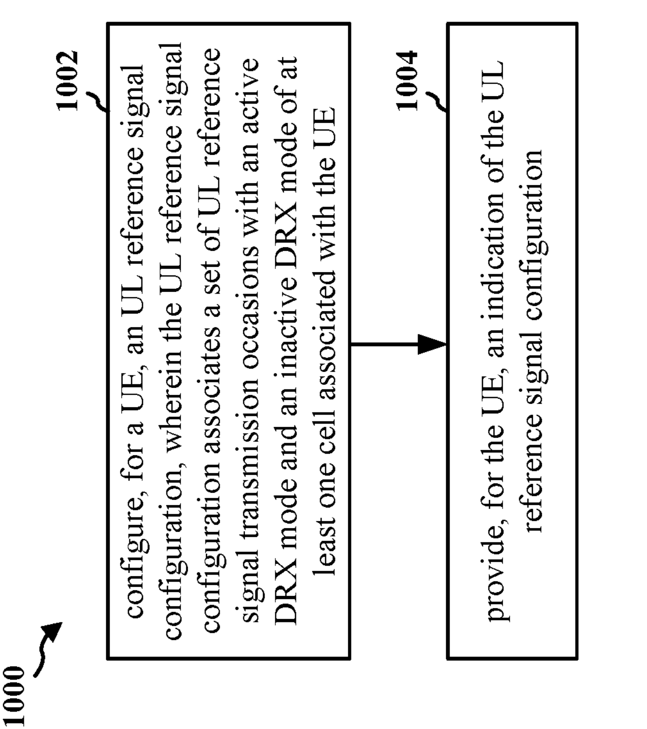
FIG. 10 is a flowchart of a method of wireless communication, in accordance with various aspects of the present disclosure.

FIG. 10 is a flowchart 1000 of a method of wireless communication, in various aspects. The method may be performed by a network entity such as base station, LMF. SE, and/or the like (e.g., the base station 102, 804; the network entity 504, 816, 1102, 1202, 1360). In some aspects, the method may include aspects described in connection with the communication flow in FIG. 5 and/or aspects described in FIGS. 6-8. The method provides for cell DRX impact reference signals for positioning and sensing may allow for improved positioning/sensing operations and intra-node information exchange for TRPs by configuring and regulating UE UL positioning and cell DRX operations, for improved positioning operations using different UL reference signals positioning/sensing operations by providing an extensible framework for configuring and regulating UE UL positioning and cell DRX operations, and for improved cell/TRP power consumption while still providing sufficient signaling for positioning/sensing operations and intra-node information exchange for TRPs by providing dynamic adaptation of DRX configurations and cycles.

At 1002, a network entity configures, for a UE, an UL reference signal configuration, where the UL reference signal configuration associates a set of UL reference signal transmission occasions with an active DRX mode and an inactive DRX mode of at least one cell associated with the UE. As an example, the configuration may be performed, at least in part, by the component 199. FIGS. 5-8 illustrate an example of the network entity 504 configuring such a configuration for a UE (e.g., the UE 502).

The network entity 504 (e.g., 804, 816 in FIG. 8) may be configured to configure (at 506), for the UE 502, an UL reference signal configuration 508 (e.g., 704 in FIG. 7), where the UL reference signal configuration 508 (e.g., 704 in FIG. 7) associates a set of UL reference signal transmission occasions (e.g., 612 in FIG. 6) with an active DRX mode (e.g., 608 in FIG. 6) and an inactive DRX mode (e.g., 606 in FIG. 6) of at least one cell associated with the UE 502. In aspects, an UL reference signal may be, without limitation, a SRS for positioning (SRS-pos), a demodulation reference signal (DMRS), and/or the like.

In aspects, the UL reference signal configuration 508 (e.g., 704 in FIG. 7) may include dropping criteria (e.g., 714 in FIG. 7), described in further detail herein, by which the UE 502 may be configured to schedule and/or drop (e.g., by Tx 710 in FIG. 7) UL resources for UL reference signals based on a cell DRX configuration(s) 512 (e.g., 706 in FIG. 7) and measurement (e.g., 610 in FIG. 6)/transmit (e.g., 612 in FIG. 6) occasions for UL reference signals overlapping (e.g., 614, 616, 618 in FIG. 6) with the DRX active (e.g., 602 in FIG. 6)/inactive (e.g., 606 in FIG. 6) mode portions for cells' DRX cycles (e.g., 608 in FIG. 6).

At 1004, the network entity provides, for the UE, an indication of the UL reference signal configuration. As an example, the configuration may be performed, at least in part, by the component 199. FIGS. 5-8 illustrate an example of the network entity 504 providing such an UL reference signal configuration for a UE (e.g., the UE 502).

The network entity 504 (e.g., 804, 816 in FIG. 8) may be configured to provide/transmit the UL reference signal configuration 508 (e.g., 704 in FIG. 7) to the UE 502. The UL reference signal configuration 508 (e.g., 704 in FIG. 7) (e.g., associating a set of UL reference signal transmission occasions (e.g., 612 in FIG. 6) with an active DRX mode (e.g., 608 in FIG. 6) and an inactive DRX mode (e.g., 606 in FIG. 6) of at least one cell associated with the UE 502) may be provided/transmitted by the network entity 504 (e.g., 804, 816 in FIG. 8) and received by the UE 502 using RRC signaling.

Figure 11:
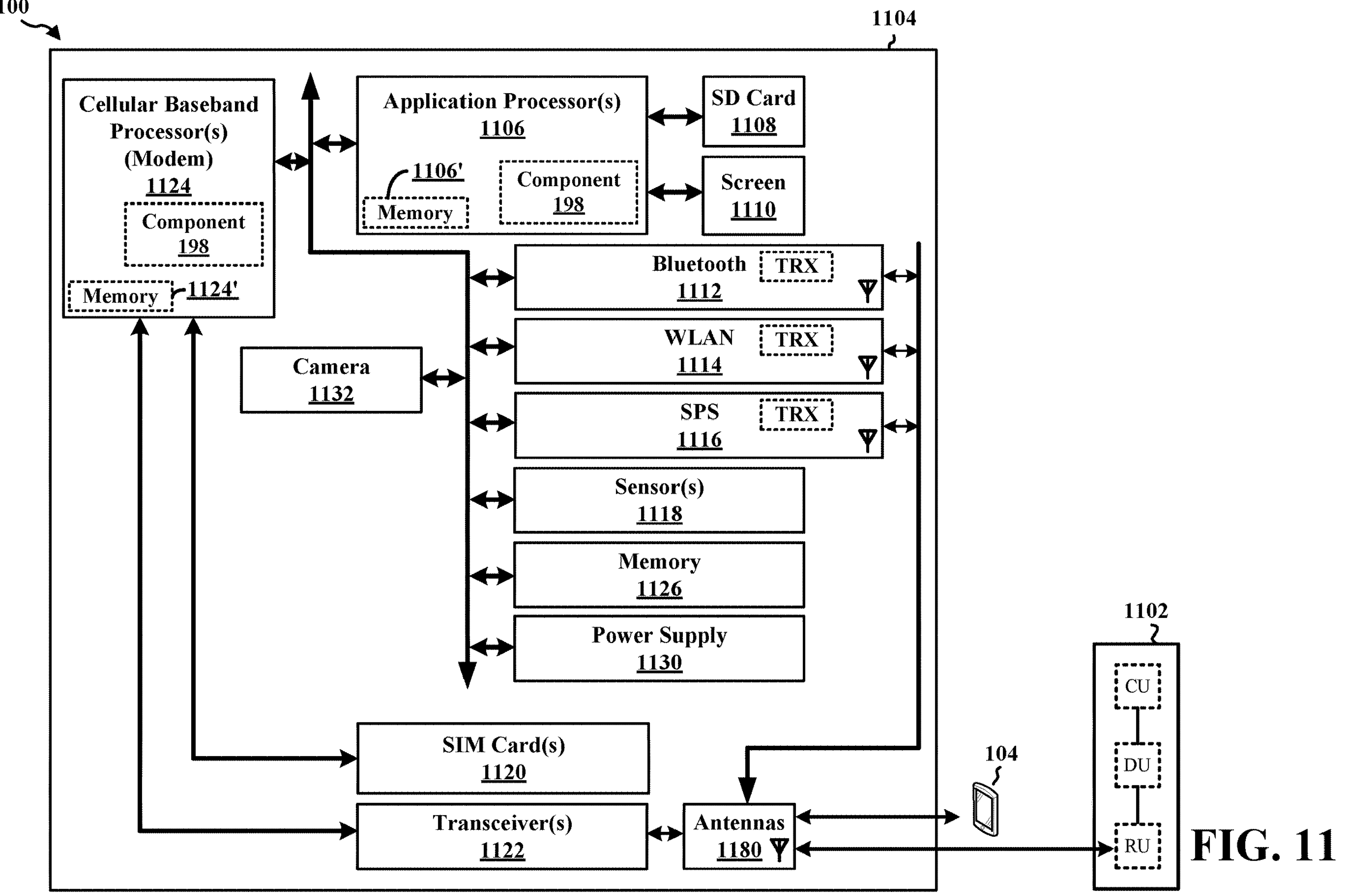
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include at least one cellular baseband processor 1124 (also referred to as a modem) coupled to one or more transceivers 1122 (e.g., cellular RF transceiver). The cellular baseband processor(s) 1124 may include at least one on-chip memory 1124'. In some aspects, the apparatus 1104 may further include one or more subscriber identity modules (SIM) cards 1120 and at least one application processor 1106 coupled to a secure digital (SD) card 1108 and a screen 1110. The application processor(s) 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor(s) 1124 communicates through the transceiver(s) 1122 via one or more antennas 1180 with the UE 104 and/or with an RU associated with a network entity 1102. The cellular baseband processor(s) 1124 and the application processor(s) 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor(s) 1124 and the application processor(s) 1106 are each responsible for general processing, including the execution of software stored on the computer-readable medium/memory. The software, when executed by the cellular baseband processor(s) 1124/application processor(s) 1106, causes the cellular baseband processor(s) 1124/application processor(s) 1106 to perform the various functions described supra. The computer-readable medium/memory may also be used for storing data that is manipulated by the cellular baseband processor(s) 1124/application processor(s) 1106 when executing software. The cellular baseband processor(s) 1124/application processor(s) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) 1124 and/or the application processor(s) 1106, and in another configuration, the apparatus 1104 may be the entire UE (e.g., see UE 350 of FIG. 3) and include the additional modules of the apparatus 1104.

As discussed supra, the component 198 may be configured to receive, from a network entity, an indication of an UL reference signal configuration, where the UL reference signal configuration associates a set of UL reference signal transmission occasions with an active DRX mode and an inactive DRX mode of at least one cell associated with the UE. The component 198 may also be configured to provide, for at least one TRP associated with the at least one cell, and at the set of UL reference signal transmission occasions, at least one UL reference signal during a portion of the active DRX mode based on the UL reference signal configuration. The component 198 may be configured, where the UL reference signal configuration indicates dropping criteria associated with UL resources for the at least one UL reference signal, to drop an UL resource at one of the set of UL reference signal transmission occasions based on the dropping criteria. The component 198 may be configured to provide, for the network entity, at least one DRX information request corresponding to the at least one cell associated with the UE, and may be configured to receive, from the network entity based on the at least one DRX information request, at least one DRX configuration corresponding to the at least one cell associated with the UE. The component 198 may be further configured to perform any of the aspects described in connection with the flowcharts in any of FIGS. 9, 10, and/or any of the aspects performed by a wireless device for any of FIGS. 5-8. The component 198 may be within the cellular baseband processor(s) 1124, the application processor(s) 1106, or both the cellular baseband processor(s) 1124 and the application processor(s) 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) 1124 and/or the application processor(s) 1106, may include means for receiving, from a network entity, an indication of an UL reference signal configuration, where the UL reference signal configuration associates a set of UL reference signal transmission occasions with an active DRX mode and an inactive DRX mode of at least one cell associated with the UE. In the configuration, the apparatus 1104, and in particular the cellular baseband processor(s) 1124 and/or the application processor(s) 1106, may include means for providing, for at least one TRP associated with the at least one cell, and at the set of UL reference signal transmission occasions, at least one UL reference signal during a portion of the active DRX mode based on the UL reference signal configuration. In one configuration, the apparatus 1104, and in particular the cellular baseband processor(s) 1124 and/or the application processor(s) 1106, may include means for, where the UL reference signal configuration indicates dropping criteria associated with UL resources for the at least one UL reference signal, dropping an UL resource at one of the set of UL reference signal transmission occasions based on the dropping criteria. In one configuration, the apparatus 1104, and in particular the cellular baseband processor(s) 1124 and/or the application processor(s) 1106, may include means for providing, for the network entity, at least one DRX information request corresponding to the at least one cell associated with the UE, and for receiving, from the network entity based on the at least one DRX information request, at least one DRX configuration corresponding to the at least one cell associated with the UE. The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
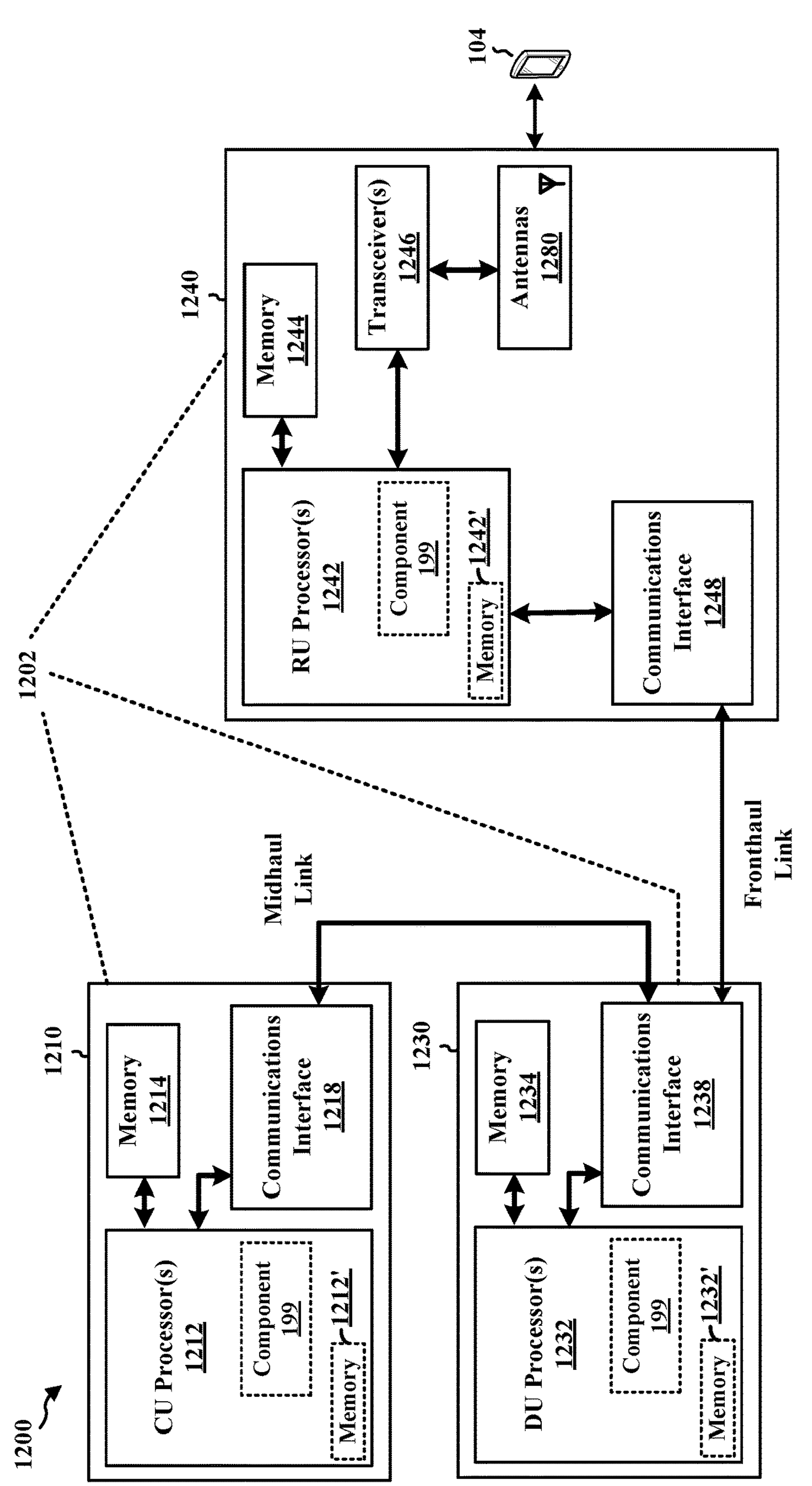
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor 1212. The CU processor(s) 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor 1232. The DU processor(s) 1232 may include on-chip memory 1232'. In some aspects, the DU 1230 may further include additional memory modules 1234 and a communications interface 1238. The DU 1230 communicates with the RU 1240 through a fronthaul link. The RU 1240 may include at least one RU processor 1242. The RU processor(s) 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to configure, for a UE, an UL reference signal configuration, where the UL reference signal configuration associates UL reference signal transmission occasions with an active DRX mode and an inactive DRX mode of at least one cell associated with the UE. The component 199 may also be configured to provide, for the UE, the UL reference signal configuration. The component 199 may be configured to receive, from the UE and at the set of UL reference signal transmission occasions, at least one UL reference signal during a portion of the active DRX mode, where the network entity is a network node. The component 199 may be configured to transmit, for at least one of a LMF or a sensing entity, at least one of: an indication of an inactive DRX mode, associated with the at least one cell associated with the UE, that corresponds to the empty portion associated with the dropped UL resource at one of the set of UL reference signal transmission occasions based on the dropping criteria; or at least one DRX cycle, associated with the at least one cell, that overlaps with at least one UL positioning reference signal of the UE. The component 199 may be configured to receive, from the UE, at least one DRX information request corresponding to the at least one cell associated with the UE, and may provide, for the UE based on the at least one DRX information request, at least one DRX configuration corresponding to the at least one cell associated with the UE. The component 199 may be further configured to perform any of the aspects described in connection with the flowcharts in any of FIGS. 9, 10, and/or any of the aspects performed by a wireless device for any of FIGS. 5-8. The component 199 may be within one or more processors of one or more of the CU 1210. DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 may include means for configuring, for a UE, an UL reference signal configuration, where the UL reference signal configuration associates UL reference signal transmission occasions with an active DRX mode and an inactive DRX mode of at least one cell associated with the UE. In the configuration, the network entity 1202 may include means for providing, for the UE, the UL reference signal configuration. In one configuration, the network entity 1202 may include means for receiving, from the UE and at the set of UL reference signal transmission occasions, at least one UL reference signal during a portion of the active DRX mode, where the network entity is a network node. In one configuration, the network entity 1202 may include means for transmitting, for at least one of a LMF or a sensing entity, at least one of: an indication of an inactive DRX mode, associated with the at least one cell associated with the UE, that corresponds to the empty portion associated with the dropped UL resource at one of the set of UL reference signal transmission occasions based on the dropping criteria; or at least one DRX cycle, associated with the at least one cell, that overlaps with at least one UL positioning reference signal of the UE. In one configuration, the network entity 1202 may include means for receiving, from the UE, at least one DRX information request corresponding to the at least one cell associated with the UE, and may provide, for the UE based on the at least one DRX information request, at least one DRX configuration corresponding to the at least one cell associated with the UE. The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Figure 13:
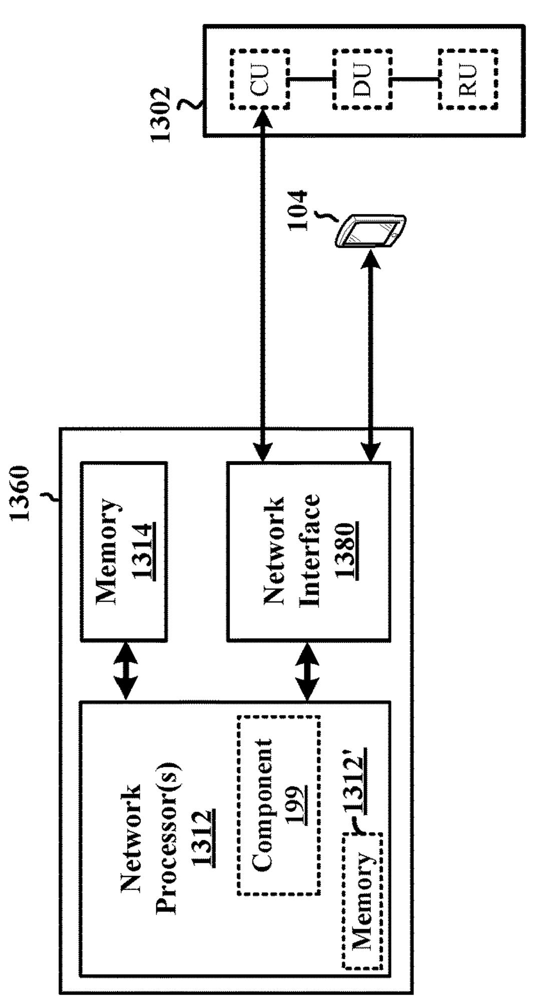
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include at least one network processor 1312. The network processor(s) 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302, and with the UE 104. The on-chip memory 1312' and the additional memory modules 1314 may each be considered a computer-readable medium/memory. Each computer-readable medium/memory may be non-transitory. The network processor(s) 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to configure, for a UE, an UL reference signal configuration, where the UL reference signal configuration associates UL reference signal transmission occasions with an active DRX mode and an inactive DRX mode of at least one cell associated with the UE. The component 199 may also be configured to provide, for the UE, the UL reference signal configuration. The component 199 may be configured to receive, from the UE and at the set of UL reference signal transmission occasions, at least one UL reference signal during a portion of the active DRX mode, where the network entity is a network node. The component 199 may be configured to transmit, for at least one of a LMF or a sensing entity, at least one of: an indication of an inactive DRX mode, associated with the at least one cell associated with the UE, that corresponds to the empty portion associated with the dropped UL resource at one of the set of UL reference signal transmission occasions based on the dropping criteria; or at least one DRX cycle, associated with the at least one cell, that overlaps with at least one UL positioning reference signal of the UE. The component 199 may be configured to receive, from the UE, at least one DRX information request corresponding to the at least one cell associated with the UE, and may provide, for the UE based on the at least one DRX information request, at least one DRX configuration corresponding to the at least one cell associated with the UE. The component 199 may be further configured to perform any of the aspects described in connection with the flowcharts in any of FIGS. 9, 10, and/or any of the aspects performed by a wireless device for any of FIGS. 5-8. The component 199 may be within the network processor(s) 1312. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1360 may include a variety of components configured for various functions. In one configuration, the network entity 1360 may include means for configuring, for a UE, an UL reference signal configuration, where the UL reference signal configuration associates UL reference signal transmission occasions with an active DRX mode and an inactive DRX mode of at least one cell associated with the UE. In the configuration, the network entity 1360 may include means for providing, for the UE, the UL reference signal configuration. In one configuration, the network entity 1360 may include means for receiving, from the UE and at the set of UL reference signal transmission occasions, at least one UL reference signal during a portion of the active DRX mode, where the network entity is a network node. In one configuration, the network entity 1360 may include means for transmitting, for at least one of a LMF or a sensing entity, at least one of: an indication of an inactive DRX mode, associated with the at least one cell associated with the UE, that corresponds to the empty portion associated with the dropped UL resource at one of the set of UL reference signal transmission occasions based on the dropping criteria; or at least one DRX cycle, associated with the at least one cell, that overlaps with at least one UL positioning reference signal of the UE. In one configuration, the network entity 1360 may include means for receiving, from the UE, at least one DRX information request corresponding to the at least one cell associated with the UE, and may provide, for the UE based on the at least one DRX information request, at least one DRX configuration corresponding to the at least one cell associated with the UE. The means may be the component 199 of the network entity 1360 configured to perform the functions recited by the means.

Wireless devices in wireless networks may perform positioning and sensing operations. Wireless devices and TRPs may also operate in modes associated with DRX, such as for UE DRX cycles and cell DRX cycles, in which a UE and/or TRP may monitor for/transmit control signaling such as a PDCCH discontinuously using an ON and OFF pattern (e.g., e.g., an active DRX mode and an inactive DRX mode). Wireless device and/or TRP power may be conserved through DRX operations. As an example, PDCCH skipping may be utilized in which a UE receives DCI that schedule uplink or downlink communications and that includes indications to skip PDCCH monitoring for a duration of time. Similarly, a TRP may operate in an inactive DRX mode during which reception of wireless signals is not performed. However, misalignment between various UE DRX cycles and cell DRX cycles (of a TRP) may not allow different wireless signals to be transmitted/received and may degrade or impair positioning and sensing operations. As another example, inter-node information exchange between TRPs and/or other network devices may be degraded or impaired. Likewise, changes to UE DRX cycles and/or cell DRX cycles may affect SSB transmissions or impact idle/inactive UEs.

Various aspects herein for cell DRX impact reference signals for positioning and sensing may improve positioning/sensing operations and intra-node information exchange for TRPs by configuring and regulating UE UL positioning and cell DRX operations. Aspects may improve positioning operations using different UL reference signals positioning/sensing operations by providing an extensible framework for configuring and regulating UE UL positioning and cell DRX operations. Aspects may also improve cell/TRP power consumption while still providing sufficient signaling for positioning/sensing operations and intra-node information exchange for TRPs by providing dynamic adaptation of DRX configurations and cycles.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving, from a network entity, an indication of an uplink (UL) reference signal configuration, wherein the UL reference signal configuration associates a set of UL reference signal transmission occasions with an active discontinuous reception (DRX) mode and an inactive DRX mode of at least one cell associated with the UE; and providing, for at least one transmit receive point (TRP) associated with the at least one cell and at the set of UL reference signal transmission occasions, at least one UL reference signal during a portion of the active DRX mode based on the UL reference signal configuration.

Aspect 2 is the method of aspect 1, wherein the at least one UL reference signal is one or more of: a sounding reference signal (SRS) for positioning; or a demodulation reference signal (DMRS).

Aspect 3 is the method of any of aspects 1 and 2, wherein the at least one UL reference signal includes position measurement data; and wherein the at least one cell associated with the UE includes at least one of a serving cell or at least one neighbor cell of the UE.

Aspect 4 is the method of any of aspects 1 to 3, wherein the network entity is at least one of a base station, a location management function (LMF), or a sensing entity.

Aspect 5 is the method of any of aspects 1 to 4, wherein the UL reference signal configuration indicates dropping criteria associated with UL resources for the at least one UL reference signal; wherein the method further comprises: dropping an UL resource at one of the set of UL reference signal transmission occasions based on the dropping criteria.

Aspect 6 is the method of aspect 5, wherein the dropping criteria indicates an overlap duration of a positioning reference signal and a DRX cycle of the at least one cell associated with the UE that is greater than or equal to a configured number of orthogonal frequency division multiplexing (OFDM) symbols; wherein the UL resource is at least a portion of a sounding reference signal (SRS) for positioning; and wherein dropping the UL resource at one of the set of UL reference signal transmission occasions based on the dropping criteria includes dropping one or more UL resources for each cell of the at least one cell associated with the UE that is in the inactive DRX mode and for which the dropping criteria is met.

Aspect 7 is the method of aspect 6, wherein at least a portion of the SRS for positioning includes one or more symbols of the SRS for positioning outside of the overlap duration.

Aspect 8 is the method of aspect 5, wherein the dropping criteria indicates (i) a cell number threshold, wherein the cell number threshold corresponds to a first number of cells in an active DRX mode and (ii) an overlap duration of a positioning reference signal and a DRX cycle of the at least one cell associated with the UE that is greater than or equal to a configured number of orthogonal frequency division multiplexing (OFDM) symbols; wherein the UL resource is at least a portion of a sounding reference signal (SRS) for positioning; and wherein dropping the UL resource at one of the set of UL reference signal transmission occasions based on the dropping criteria includes dropping one or more UL resources for each cell of the at least one cell associated with the UE that is in the active DRX mode and for which the dropping criteria is met.

Aspect 9 is the method of aspect 8, wherein the at least one cell associated with the UE includes a second number of cells in the active DRX mode that is less than the first number of cells in the active DRX mode; wherein at least a portion of the SRS for positioning includes at least one of a maximum number of overlapping symbols of the SRS for positioning or a minimum number of overlapping symbols of the SRS for positioning.

Aspect 10 is the method of aspect 5, wherein the dropping criteria indicates (i) a set of reference signals that corresponds to a subset of the at least one cell associated with the UE, wherein the set of reference signals is associated with the UL resources for quasi-co-location (QCL), and (ii) an overlap duration of a positioning reference signal and a DRX cycle of the at least one cell associated with the UE that is greater than or equal to a configured number of orthogonal frequency division multiplexing (OFDM) symbols; wherein the UL resource is at least a portion of a sounding reference signal (SRS) for positioning; and wherein dropping the UL resource at one of the set of UL reference signal transmission occasions based on the dropping criteria includes dropping one or more UL resources for each cell of the subset of the at least one cell associated with the UE that is in the active DRX mode and for which the dropping criteria is met.

Aspect 11 is the method of aspect 10, wherein at least a portion of the SRS for positioning includes one or more symbols of the SRS for positioning outside of the overlap duration.

Aspect 12 is the method of any of aspects 1 to 11, further comprising: providing, for the network entity, at least one DRX information request corresponding to the at least one cell associated with the UE; and receiving, from the network entity based on the at least one DRX information request, at least one DRX configuration corresponding to the at least one cell associated with the UE.

Aspect 13 is the method of aspect 12, wherein the at least one DRX configuration corresponding to the at least one cell associated with the UE is comprised in at least one of a dedicated positioning system information block (SIB), a sensing SIB, a radio resource management (RRM) SIB, a medium access control (MAC) control element (MAC-CE), downlink control information (DCI), a radio resource control (RRC) signaling configuration, a long term evolution (LTE) positioning protocol (LPP) message, or assistance information; or wherein the at least one DRX configuration corresponding to the at least one cell associated with the UE is in response to the at least one DRX information request corresponding to the at least one cell associated with the UE.

Aspect 14 is a method of wireless communication at a network entity, comprising: configuring, for a user equipment (UE), an uplink (UL) reference signal configuration, wherein the UL reference signal configuration associates a set of UL reference signal transmission occasions with an active discontinuous reception (DRX) mode and an inactive DRX mode of at least one cell associated with the UE; and providing, for the UE, an indication of the UL reference signal configuration.

Aspect 15 is the method of aspect 14, wherein the network entity is at least one of a base station, a location management function (LMF), or a sensing entity.

Aspect 16 is the method of any of aspects 14 and 15, further comprising: receiving, from the UE and at the set of UL reference signal transmission occasions, at least one UL reference signal during a portion of the active DRX mode, wherein the network entity is a network node.

Aspect 17 is the method of aspect 16, wherein the at least one UL reference signal is one or more of: a sounding reference signal (SRS) for positioning; or a demodulation reference signal (DMRS).

Aspect 18 is the method of any of aspects 16 and 17, wherein the at least one UL reference signal includes position measurement data; and wherein the at least one cell associated with the UE includes at least one of a serving cell or at least one neighbor cell of the UE.

Aspect 19 is the method of any of aspects 16 to 18, wherein the UL reference signal configuration indicates dropping criteria associated with UL resources for the at least one UL reference signal; wherein one or more of the at least one UL reference signal includes an empty portion associated with a dropped UL resource at one of the set of UL reference signal transmission occasions based on the dropping criteria. Aspect 20 is the method of aspect 19, wherein the dropping criteria indicates an overlap duration of a positioning reference signal and a DRX cycle of the at least one cell associated with the UE that is greater than or equal to a configured number of orthogonal frequency division multiplexing (OFDM) symbols; wherein the empty portion associated with the dropped UL resource is at least a portion of a sounding reference signal (SRS) for positioning; and wherein the dropped UL resource at one of the set of UL reference signal transmission occasions, based on the dropping criteria, corresponds to each cell of the at least one cell associated with the UE that is in the inactive DRX mode and for which the dropping criteria is met.

Aspect 21 is the method of aspect 20, wherein at least a portion of the SRS for positioning includes one or more symbols of the SRS for positioning outside of the overlap duration.

Aspect 22 is the method of aspect 19, wherein the dropping criteria indicates (i) a cell number threshold, wherein the cell number threshold corresponds to a first number of cells in an active DRX mode and (ii) an overlap duration of a positioning reference signal and a DRX cycle of the at least one cell associated with the UE that is greater than or equal to a configured number of orthogonal frequency division multiplexing (OFDM) symbols; wherein the empty portion associated with the dropped UL resource is at least a portion of a sounding reference signal (SRS) for positioning; and wherein the dropped UL resource at one of the set of UL reference signal transmission occasions, based on the dropping criteria, corresponds to each cell of the at least one cell associated with the UE that is in the active DRX mode and for which the dropping criteria is met.

Aspect 23 is the method of aspect 22, wherein the at least one cell associated with the UE includes a second number of cells in the active DRX mode that is less than the first number of cells in the active DRX mode; wherein the at least a portion of the SRS for positioning includes at least one of a maximum number of overlapping symbols of the SRS for positioning or a minimum number of overlapping symbols of the SRS for positioning.

Aspect 24 is the method of aspect 19, wherein the dropping criteria indicates (i) a set of reference signals that correspond to a subset of the at least one cell associated with the UE, wherein the set of reference signals are associated with the UL resources for quasi-co-location (QCL), and (ii) an overlap duration of a positioning reference signal and a DRX cycle of the at least one cell associated with the UE that is greater than or equal to a configured number of orthogonal frequency division multiplexing (OFDM) symbols; wherein the empty portion associated with the dropped UL resource is at least a portion of a sounding reference signal (SRS) for positioning; and wherein the dropped UL resource at one of the set of UL reference signal transmission occasions, based on the dropping criteria, corresponds to each cell of the subset of the at least one cell associated with the UE that is in the active DRX mode and for which the dropping criteria is met.

Aspect 25 is the method of aspect 24, wherein at least a portion of the SRS for positioning includes one or more symbols of the SRS for positioning outside of the overlap duration.

Aspect 26 is the method of any of aspects 19 to 25, wherein the network entity is a base station, and wherein the method further comprises: transmitting, for at least one of a location management function (LMF) or a sensing entity, at least one of: an indication of the inactive DRX mode, associated with the at least one cell associated with the UE, that corresponds to the empty portion associated with the dropped UL resource at one of the set of UL reference signal transmission occasions based on the dropping criteria; or at least one DRX cycle, associated with the at least one cell, that overlaps with at least one UL positioning reference signal of the UE.

Aspect 27 is the method of any of aspects 14 to 26, further comprising: receiving, from the UE, at least one DRX information request corresponding the at least one cell associated with the UE; and providing, for the UE based on the at least one DRX information request, at least one DRX configuration corresponding to the at least one cell associated with the UE.

Aspect 28 is the method of aspect 27, wherein the at least one DRX configuration corresponding to the at least one cell associated with the UE is comprised in at least one of a dedicated positioning system information block (SIB), a sensing SIB, a radio resource management (RRM) SIB, a medium access control (MAC) control element (MAC-CE), downlink control information (DCI), a radio resource control (RRC) signaling configuration, a long term evolution (LTE) positioning protocol (LPP) message, or assistance information; or wherein the at least one DRX configuration corresponding to the at least one cell associated with the UE is in response to the at least one DRX information request corresponding to the at least one cell associated with the UE.

Aspect 29 is an apparatus for wireless communication including means for implementing any of aspects 1 to 13.

Aspect 30 is a computer-readable medium (e.g., a non-transitory computer-readable medium) storing computer executable code, the code when executed by at least one processor causes the at least one processor to implement any of aspects 1 to 13.

Aspect 31 is an apparatus for wireless communication at a network node. The apparatus includes a memory; and at least one processor coupled to the memory and, based at least in part on information stored in the memory, the at least one processor is configured to implement any of aspects 1 to 13.

Aspect 32 is the apparatus of aspect 31, further including at least one of a transceiver or an antenna coupled to the at least one processor.

Aspect 33 is an apparatus for wireless communication including means for implementing any of aspects 14 to 28.

Aspect 34 is a computer-readable medium (e.g., a non-transitory computer-readable medium) storing computer executable code, the code when executed by at least one processor causes the at least one processor to implement any of aspects 14 to 28.

Aspect 35 is an apparatus for wireless communication at a network node. The apparatus includes a memory; and at least one processor coupled to the memory and, based at least in part on information stored in the memory, the at least one processor is configured to implement any of aspects 14 to 28.

Aspect 36 is the apparatus of aspect 35, further including at least one of a transceiver or an antenna coupled to the at least one processor.

What is claimed is:

1. An apparatus for wireless communication at a user equipment (UE), comprising:

at least one memory; and at least one processor coupled to the at least one memory and, based at least in part on information stored in the at least one memory, the at least one processor is configured to cause the apparatus to:

receive, from a network entity, an indication of an uplink (UL) reference signal configuration, wherein the UL reference signal configuration associates a set of UL reference signal transmission occasions with an active discontinuous reception (DRX) mode and an inactive DRX mode of at least one cell associated with the UE, wherein the UL reference signal configuration indicates dropping criteria associated with a DRX cycle of the at least one cell and with UL resources for the at least one UL reference signal; and provide, for at least one transmit receive point (TRP) associated with the at least one cell and at the set of UL reference signal transmission occasions, at least one UL reference signal during a portion of the active DRX mode based on the UL reference signal configuration.

2. The apparatus of claim 1, wherein the at least one UL reference signal is one or more of:

a sounding reference signal (SRS) for positioning; or a demodulation reference signal (DMRS).

3. The apparatus of claim 1, wherein the at least one UL reference signal includes position measurement data; and wherein the at least one cell associated with the UE includes at least one of a serving cell or at least one neighbor cell of the UE.

4. The apparatus of claim 1, wherein the network entity is at least one of a base station, a location management function (LMF), or a sensing entity.

5. The apparatus of claim 1, wherein the at least one processor is further configured to cause the apparatus to:

drop an UL resource at one of the set of UL reference signal transmission occasions based on the dropping criteria.

6. The apparatus of claim 5, wherein the dropping criteria indicates an overlap duration of a positioning reference signal and the DRX cycle of the at least one cell associated with the UE that is greater than or equal to a configured number of orthogonal frequency division multiplexing (OFDM) symbols;

wherein the UL resource is at least a portion of a sounding reference signal (SRS) for positioning; and wherein to drop the UL resource at one of the set of UL reference signal transmission occasions based on the dropping criteria, the at least one processor is configured to cause the apparatus to drop one or more UL resources for each cell of the at least one cell associated with the UE that is in the inactive DRX mode and for which the dropping criteria is met.

7. The apparatus of claim 6, wherein at least a portion of the SRS for positioning includes one or more symbols of the SRS for positioning outside of the overlap duration.

8. The apparatus of claim 5, wherein the dropping criteria indicates (i) a cell number threshold, wherein the cell number threshold corresponds to a first number of cells in an active DRX mode and (ii) an overlap duration of a positioning reference signal and a DRX cycle of the at least one cell associated with the UE that is greater than or equal to a configured number of orthogonal frequency division multiplexing (OFDM) symbols;

wherein the UL resource is at least a portion of a sounding reference signal (SRS) for positioning; and wherein to drop the UL resource at one of the set of UL reference signal transmission occasions based on the dropping criteria, the at least one processor is configured to cause the apparatus to drop one or more UL resources for each cell of the at least one cell associated with the UE that is in the active DRX mode and for which the dropping criteria is met.

9. The apparatus of claim 8, wherein the at least one cell associated with the UE includes a second number of cells in the active DRX mode that is less than the first number of cells in the active DRX mode;

wherein at least a portion of the SRS for positioning includes at least one of a maximum number of overlapping symbols of the SRS for positioning or a minimum number of overlapping symbols of the SRS for positioning.

10. The apparatus of claim 5, wherein the dropping criteria indicates (i) a set of reference signals that corresponds to a subset of the at least one cell associated with the UE, wherein the set of reference signals is associated with the UL resources for quasi-co-location (QCL), and (ii) an overlap duration of a positioning reference signal and a DRX cycle of the at least one cell associated with the UE that is greater than or equal to a configured number of orthogonal frequency division multiplexing (OFDM) symbols;

wherein the UL resource is at least a portion of a sounding reference signal (SRS) for positioning; and wherein to drop the UL resource at one of the set of UL reference signal transmission occasions based on the dropping criteria, the at least one processor is configured to cause the apparatus to drop one or more UL resources for each cell of the subset of the at least one cell associated with the UE that is in the active DRX mode and for which the dropping criteria is met.

11. The apparatus of claim 10, wherein at least a portion of the SRS for positioning includes one or more symbols of the SRS for positioning outside of the overlap duration.

12. The apparatus of claim 1, wherein the at least one processor is further configured to cause the apparatus to:

provide, for the network entity, at least one DRX information request corresponding to the at least one cell associated with the UE; and receive, from the network entity based on the at least one DRX information request, at least one DRX configuration corresponding to the at least one cell associated with the UE.

13. The apparatus of claim 12, wherein the at least one DRX configuration corresponding to the at least one cell associated with the UE is comprised in at least one of a dedicated positioning system information block (SIB), a sensing SIB, a radio resource management (RRM) SIB, a medium access control (MAC) control element (MAC-CE), downlink control information (DCI), a radio resource control (RRC) signaling configuration, a long term evolution (LTE) positioning protocol (LPP) message, or assistance information; or wherein the at least one DRX configuration corresponding to the at least one cell associated with the UE is in response to the at least one DRX information request corresponding to the at least one cell associated with the UE.

14. An apparatus for wireless communication at a network entity, comprising:

at least one memory; and at least one processor coupled to the at least one memory and, based at least in part on information stored in the at least one memory, the at least one processor is configured to cause the apparatus to:

configure, for a user equipment (UE), an uplink (UL) reference signal configuration, wherein the UL reference signal configuration associates a set of UL reference signal transmission occasions with an active discontinuous reception (DRX) mode and an inactive DRX mode of at least one cell associated with the UE, wherein the UL reference signal configuration indicates dropping criteria associated with a DRX cycle of the at least one cell and with UL resources for the at least one UL reference signal; and provide, for the UE, an indication of the UL reference signal configuration.

15. The apparatus of claim 14, wherein the network entity is at least one of a base station, a location management function (LMF), or a sensing entity.

16. The apparatus of claim 14, wherein the at least one processor is further configured to cause the apparatus to:

receive, from the UE and at the set of UL reference signal transmission occasions, at least one UL reference signal during a portion of the active DRX mode, wherein the network entity is a network node.

17. The apparatus of claim 16, wherein the at least one UL reference signal is one or more of:

a sounding reference signal (SRS) for positioning; or a demodulation reference signal (DMRS).

18. The apparatus of claim 16, wherein the at least one UL reference signal includes position measurement data; and wherein the at least one cell associated with the UE includes at least one of a serving cell or at least one neighbor cell of the UE.

19. The apparatus of claim 16, wherein one or more of the at least one UL reference signal includes an empty portion associated with a dropped UL resource at one of the set of UL reference signal transmission occasions based on the dropping criteria.

20. The apparatus of claim 19, wherein the dropping criteria indicates an overlap duration of a positioning reference signal and the DRX cycle of the at least one cell associated with the UE that is greater than or equal to a configured number of orthogonal frequency division multiplexing (OFDM) symbols;

wherein the empty portion associated with the dropped UL resource is at least a portion of a sounding reference signal (SRS) for positioning; and wherein the dropped UL resource at one of the set of UL reference signal transmission occasions, based on the dropping criteria, corresponds to each cell of the at least one cell associated with the UE that is in the inactive DRX mode and for which the dropping criteria is met.

21. The apparatus of claim 20, wherein at least a portion of the SRS for positioning includes one or more symbols of the SRS for positioning outside of the overlap duration.

22. The apparatus of claim 19, wherein the dropping criteria indicates (i) a cell number threshold, wherein the cell number threshold corresponds to a first number of cells in an active DRX mode and (ii) an overlap duration of a positioning reference signal and a DRX cycle of the at least one cell associated with the UE that is greater than or equal to a configured number of orthogonal frequency division multiplexing (OFDM) symbols;

wherein the empty portion associated with the dropped UL resource is at least a portion of a sounding reference signal (SRS) for positioning; and wherein the dropped UL resource at one of the set of UL reference signal transmission occasions, based on the dropping criteria, corresponds to each cell of the at least one cell associated with the UE that is in the active DRX mode and for which the dropping criteria is met.

23. The apparatus of claim 22, wherein the at least one cell associated with the UE includes a second number of cells in the active DRX mode that is less than the first number of cells in the active DRX mode;

wherein the at least a portion of the SRS for positioning includes at least one of a maximum number of overlapping symbols of the SRS for positioning or a minimum number of overlapping symbols of the SRS for positioning.

24. The apparatus of claim 19, wherein the dropping criteria indicates (i) a set of reference signals that correspond to a subset of the at least one cell associated with the UE, wherein the set of reference signals are associated with the UL resources for quasi-co-location (QCL), and (ii) an overlap duration of a positioning reference signal and a DRX cycle of the at least one cell associated with the UE that is greater than or equal to a configured number of orthogonal frequency division multiplexing (OFDM) symbols;

wherein the empty portion associated with the dropped UL resource is at least a portion of a sounding reference signal (SRS) for positioning; and wherein the dropped UL resource at one of the set of UL reference signal transmission occasions, based on the dropping criteria, corresponds to each cell of the subset of the at least one cell associated with the UE that is in the active DRX mode and for which the dropping criteria is met.

25. The apparatus of claim 24, wherein at least a portion of the SRS for positioning includes one or more symbols of the SRS for positioning outside of the overlap duration.

26. The apparatus of claim 19, wherein the network entity is a base station, and wherein the at least one processor is further configured to cause the apparatus to:

transmit, for at least one of a location management function (LMF) or a sensing entity, at least one of:

an indication of the inactive DRX mode, associated with the at least one cell associated with the UE, that corresponds to the empty portion associated with the dropped UL resource at one of the set of UL reference signal transmission occasions based on the dropping criteria; or at least one DRX cycle, associated with the at least one cell, that overlaps with at least one UL positioning reference signal of the UE.

27. The apparatus of claim 14, wherein the at least one processor is further configured to cause the apparatus to:

receive, from the UE, at least one DRX information request corresponding the at least one cell associated with the UE; and provide, for the UE based on the at least one DRX information request, at least one DRX configuration corresponding to the at least one cell associated with the UE.

28. The apparatus of claim 27, wherein the at least one DRX configuration corresponding to the at least one cell associated with the UE is comprised in at least one of a dedicated positioning system information block (SIB), a sensing SIB, a radio resource management (RRM) SIB, a medium access control (MAC) control element (MAC-CE), downlink control information (DCI), a radio resource control (RRC) signaling configuration, a long term evolution (LTE) positioning protocol (LPP) message, or assistance information; or wherein the at least one DRX configuration corresponding to the at least one cell associated with the UE is in response to the at least one DRX information request corresponding to the at least one cell associated with the UE.

29. A method of wireless communication at a user equipment (UE), comprising:

receiving, from a network entity, an indication of an uplink (UL) reference signal configuration, wherein the UL reference signal configuration associates a set of UL reference signal transmission occasions with an active discontinuous reception (DRX) mode and an inactive DRX mode of at least one cell associated with the UE, wherein the UL reference signal configuration indicates dropping criteria associated with a DRX cycle of the at least one cell and with UL resources for the at least one UL reference signal; and providing, for at least one transmit receive point (TRP) associated with the at least one cell and at the set of UL reference signal transmission occasions, at least one UL reference signal during a portion of the active DRX mode based on the UL reference signal configuration.

30. A method of wireless communication at a network entity, comprising:

configuring, for a user equipment (UE), an uplink (UL) reference signal configuration, wherein the UL reference signal configuration associates a set of UL reference signal transmission occasions with an active discontinuous reception (DRX) mode and an inactive DRX mode of at least one cell associated with the UE, wherein the UL reference signal configuration indicates dropping criteria associated with a DRX cycle of the at least one cell and with UL resources for the at least one UL reference signal; and providing, for the UE, an indication of the UL reference signal configuration.

* * * * *